US008744853B2

(12) United States Patent
Nishimura et al.

(10) Patent No.: US 8,744,853 B2
(45) Date of Patent: Jun. 3, 2014

(54) SPEAKER-ADAPTIVE SYNTHESIZED VOICE

(75) Inventors: Masafumi Nishimura, Kanagawa-Ken (JP); Ryuki Tachibana, Kanagawa-Ken (JP)

(73) Assignee: International Business Machines Corporation, Armonk, NY (US)

( * ) Notice: Subject to any disclaimer, the term of this patent is extended or adjusted under 35 U.S.C. 154(b) by 358 days.

(21) Appl. No.: 13/319,856

(22) PCT Filed: Mar. 16, 2010

(86) PCT No.: PCT/JP2010/054413
§ 371 (c)(1), (2), (4) Date: Nov. 10, 2011

(87) PCT Pub. No.: WO2010/137385
PCT Pub. Date: Dec. 2, 2010

(65) Prior Publication Data

US 2012/0059654 A1 Mar. 8, 2012

(30) Foreign Application Priority Data

May 28, 2009 (JP) ................................ 2009-129366

(51) Int. Cl.
*G10L 13/00* (2006.01)
*G10L 15/00* (2013.01)
*G10L 15/06* (2013.01)

(52) U.S. Cl.
USPC ............................ 704/260; 704/243; 704/258

(58) Field of Classification Search
USPC .......................... 704/207, 243, 244, 258–261
See application file for complete search history.

(56) References Cited

U.S. PATENT DOCUMENTS 6,101,469 A * 8/2000 Curtin ........................... 704/258
6,529,874 B2 * 3/2003 Kagoshima et al. .......... 704/269

(Continued)

FOREIGN PATENT DOCUMENTS

JP 1011083 A 1/1989
JP 1152987 A 6/1989

(Continued)

OTHER PUBLICATIONS

Chen et al, "An automatic prosody labeling system using ANN-based syntactic-prosodic model and GMM-based acoustic-prosodic model," in International Conference on Acoustics, Speech and Signal Processing, vol. 1, 2004, pp. 509-512.*
International Preliminary Report on Patentability dated Dec. 12, 2011 for PCT/JP2010/054413.
R. Cytron, et al., "State-of-the-art technology of Speech information Processing", IPSJ Magazine, vol. 45, No. 10, 2004.

(Continued)

*Primary Examiner* — Richemond Dorvil
*Assistant Examiner* — Olujimi Adesanya
(74) *Attorney, Agent, or Firm* — Jon A. Gibbons; Fleit Gibbons Gutman Bongini & Bianco PL

(57) ABSTRACT

An objective is to provide a technique for accurately reproducing features of a fundamental frequency of a target-speaker's voice on the basis of only a small amount of learning data. A learning apparatus learns shift amounts from a reference source F0 pattern to a target F0 pattern of a target-speaker's voice. The learning apparatus associates a source F0 pattern of a learning text to a target F0 pattern of the same learning text by associating their peaks and troughs. For each of points on the target F0 pattern, the learning apparatus obtains shift amounts in a time-axis direction and in a frequency-axis direction from a corresponding point on the source F0 pattern in reference to a result of the association, and learns a decision tree using, as an input feature vector, linguistic information obtained by parsing the learning text, and using, as an output feature vector, the calculated shift amounts.

19 Claims, 10 Drawing Sheets

(56) References Cited

U.S. PATENT DOCUMENTS

| | | | | |
|---|---|---|---|---|
| 6,760,703 | B2 * | 7/2004 | Kagoshima et al. | 704/262 |
| 7,184,958 | B2 * | 2/2007 | Kagoshima et al. | 704/260 |
| 7,979,270 | B2 * | 7/2011 | Yamada | 704/205 |
| 8,219,398 | B2 * | 7/2012 | Marple et al. | 704/260 |
| 8,407,053 | B2 * | 3/2013 | Latorre et al. | 704/260 |
| 2009/0070115 | A1 * | 3/2009 | Tachibana et al. | 704/260 |
| 2009/0326951 | A1 * | 12/2009 | Morinaka et al. | 704/268 |

FOREIGN PATENT DOCUMENTS

| | | | |
|---|---|---|---|
| JP | 05-241596 | | 9/1993 |
| JP | 792986 | A | 4/1995 |
| JP | 08-248995 | | 2/1996 |
| JP | 8248994 | A | 9/1996 |
| JP | 2003337592 | A | 11/2003 |
| JP | 2005266349 | | 9/2005 |
| JP | 2005266349 | A | 9/2005 |
| JP | 2006276660 | | 10/2006 |
| JP | 2010049196 | | 3/2010 |
| WO | 2010110095 | | 9/2010 |

OTHER PUBLICATIONS

R. Cytron, et al., "Efficiently Computing Static Single Assignment Form and the Control Dependence Graph", ACM Transactions on Programming Languages and Systems, vol. 13 No. 4, Oct. 1991.

Y. Uto et al., "Simultaneous Modeling of Spectrum and Fo for Voice Conversion", IEICE Technical Report, The Institute of Electronics, Information and Communication Engineers, pp. 103-108, NLC2007-50, SP2007-113 (Dec. 2007).

Makoto Hashimoto, Norio Higuchi, "Selection of Reference Speaker for Voice Conversion Using SSVFS Spectral Mapping with Consideration of Vector Field Smoothing Algorithm", The Transactions of the Institute of Electronics, Information and Communication Engineers, Feb. 25, 1998, vol. J81-D-II, No. 2, pp. 249 to 256.

Zhi-Wei Shuang, et al., "Frequency Warping Based on Mapping Formant Parameters", IBM China Research Lab, IBM T.J. Watson Research Center, IBM Haifa Research Lab.

Kaori Yutani, et al., "Voice Conversion Based on Simultaneous Modeling of Spectrum and F0", ICASSP 2009, IEEE, pp. 3897-3900.

B. Gillett, S. King, "Transforming F0 Contours," in Proc. Eurospeech 2003.

International Search Report for PCT/JP2010/054413, dated Apr. 9, 2010.

* cited by examiner (a)

(b)

SPEAKER-ADAPTIVE SYNTHESIZED VOICE

CROSS-REFERENCE TO RELATED APPLICATIONS

This application is based upon and claims priority from prior International (PCT) Application No. PCT/JP2010054413, filed on Mar. 16, 2010, and Japanese Patent Application No. 2009129366 filed on May 28, 2009, the entire disclosures of which are herein incorporated by reference in their entirety.

TECHNICAL FIELD

The present invention relates to a speaker-adaptive technique for generating a synthesized voice, and particularly to a speaker-adaptive technique based on fundamental frequencies.

BACKGROUND ART

Conventionally, as a method for generating a synthesized voice, a technique for speaker adaptation of the synthesized voice has been known. In this technique, voice synthesis is performed so that a synthesized voice may sound like a voice of a target-speaker's voice which is different from a reference voice of a system (e.g., Patent Literatures 1 and 2). As another method for generating a synthesized voice, a technique for speaking-style adaptation has been known. In this technique, when an inputted text is transformed into a voice signal, a synthesized voice having a designated speaking style is generated (e.g., Patent Documents 3 and 4).

In such speaker adaptation and speech-style adaptation, reproduction of a pitch of a voice, namely, reproduction of a fundamental frequency (F0) is important in reproducing the impression of the voice. The following methods have been known conventionally as a method for reproducing the fundamental frequency. Specifically, the methods include: a simple method in which a fundamental frequency is linearly transformed (see, for example, Non-patent Literature 1); a variation of this simple method (see, for example, Non-patent Literature 2); and a method in which linked feature vectors of spectrum and frequency are modeled by Gaussian Mixture Models (GMM). (e.g., for example, Non-patent Literature 3).

CITATION LIST

Patent Literatures

[Patent Literature 1] Japanese Patent Application Publication No. 11-52987

[Patent Literature 2] Japanese Patent Application Publication No. 2003-337592

[Patent Literature 3] Japanese Patent Application Publication No. 7-92986

[Patent Literature 4] Japanese Patent Application Publication No. 10-11083

Non-Patent Literatures

[Non-patent Literature 1] Z. Shuang, R. Bakis, S. Shechtman, D. Chazan, Y. Qin, "Frequency warping based on mapping format parameters," in Proc. ICSLP, September 2006, Pittsburgh Pa., USA.

[Non-patent Literature 2] B. Gillet, S. King, "Transforming F0 Contours," in Proc. EUROSPEECH 2003.

[Non-patent Literature 3] Yosuke Uto, Yoshihiko Nankaku, Akinobu Lee, Keiichi Tokuda, "Simultaneous Modeling of Spectrum and F0 for Voice Conversion," in IEICE Technical Report, NLC 2007-50, SP 2007-117 (2007-12)

SUMMARY OF INVENTION

Technical Problems

The technique of Non-patent Literature 1, however, only shifts a curve of a fundamental-frequency pattern representing a temporal change of a fundamental frequency, and does not change the form of the fundamental-frequency pattern. Since features of a speaker appear in waves of the form of the fundamental-frequency pattern, such features of the speaker cannot be reproduced with this technique. On the other hand, the technique of Non-patent Document 3 has higher accuracy than those of Non-patent Documents 1 and 2.

However, needing to learn a model of fundamental frequency in conjunction with spectrum, the technique of Non-patent Document 3 has a problem of requiring a large amount of learning data. The technique of Non-patent Document 3 further has a problem of not being able to consider important context information such as an accent type and a mora position, and a problem of not being able to reproduce a shift in a time-axis direction, such as early appearance of an accent nucleus, or delayed rising.

The Patent Literatures 1 to 4 each disclose a technique of correcting a frequency pattern of a reference voice by using difference data of a frequency pattern representing features of a target-speaker or a designated speaking style. However, any of the literatures does not describe a specific method of calculating the difference data with which the frequency pattern of the reference voice is to be corrected.

The present invention has been made to solve the above problems, and has an objective of providing a technique with which features of a fundamental frequency of a target-speaker's voice can be reproduced accurately based on only a small amount of learning data. In addition, another objective of the present invention is to provide a technique that can consider important context information, such as an accent type and a mora position, in reproducing the features of the fundamental frequency of the target-speaker's voice. Furthermore, still another objective of the present invention is to provide a technique that can reproduce features of a fundamental frequency of a target-speaker's voice, including a shift in the time-axis direction such as early appearance of an accent nucleus, or delayed rising.

Solution to Problems

In order to solve the above problems, the first aspect of the present invention provides a learning apparatus for learning shift amounts between a fundamental-frequency pattern of a reference voice and a fundamental-frequency pattern of a target speaker's voice, the fundamental-frequency pattern representing a temporal change in a fundamental frequency, the learning apparatus including: associating means for associating a fundamental-frequency pattern of the reference voice of a learning text with a fundamental-frequency pattern of the target speaker's voice of the learning text by associating peaks and troughs of the fundamental-frequency pattern of the reference voice with corresponding peaks and troughs of the fundamental-frequency pattern of the target speaker's voice; shift-amount calculating means for calculating shift amounts of each of points on the fundamental-frequency pattern of the target-speaker's voice from a corresponding point on the fundamental-frequency pattern of the reference voice in reference to a result of the association, the shift amounts including an amount of shift in the time-axis direction and an amount of shift in the frequency-axis direction; and learning means for learning a decision tree by using, as an input feature vector, linguistic information obtained by parsing the learning text, and by using, as an output feature vector, the shift amounts thus calculated.

Here, the fundamental-frequency pattern of the reference voice may be a fundamental-frequency pattern of a synthesis voice, obtained using a statistical model of a particular speaker serving as a reference (called a source speaker below). Further, the shift amount in the frequency-axis direction calculated by the shift-amount calculating means may be a shift amount of the logarithm of a frequency.

Preferably, the associating means includes: affine-transformation set calculating means for calculating a set of affine transformations for transforming the fundamental-frequency pattern of the reference voice into a pattern having a minimum difference from the fundamental-frequency pattern of the target-speaker's voice; and affine transforming means for, regarding a time-axis direction and a frequency-axis direction of the fundamental-frequency pattern as an X-axis and a Y-axis, respectively, associating each of the points on the fundamental-frequency pattern of the reference voice with one of the points on the fundamental-frequency pattern of the target-speaker's voice, the one of the points having the same X-coordinate value as a point obtained by transforming the point on the fundamental-frequency pattern of the reference voice by using a corresponding one of the affine transformations.

More preferably, the affine-transformation set calculating means sets an intonation phrase as an initial value for a processing unit used for obtaining the affine transformations, and recursively bisects the processing unit until the affine-transformation set calculating means obtains the affine transformations that transform the fundamental-frequency pattern of the reference voice into a pattern having a minimum difference from the fundamental-frequency pattern of the target-speaker's voice.

Preferably, the association by the associating means and the shift-amount calculation by the shift-amount calculating means are performed on a frame or phoneme basis.

Preferably, the learning apparatus further includes change-amount calculating means for calculating a change amount between each two adjacent points of each of the calculated shift amounts. The learning means learns the decision tree by using, as the output feature vector, the shift amounts and the change amounts of the respective shift amounts, the shift amounts being static feature vectors, the change amounts being dynamic feature vectors.

More preferably, each of the change amounts of the shift amounts includes a primary dynamic feature vector representing an inclination of the shift amount and a secondary dynamic feature vector representing a curvature of the shift amount.

The change-amount calculating means further calculates change amounts between each two adjacent points on the fundamental-frequency pattern of the target-speaker's voice in the time-axis direction and in the frequency-axis direction. The learning means learns the decision tree by additionally using, as the static feature vectors, a value in the time-axis direction and a value in the frequency-axis direction of each point on the fundamental-frequency pattern of the target-speaker's voice, and by additionally using, as the dynamic feature vectors, the change amount in the time-axis direction and the change amount in the frequency-axis direction. For each of leaf nodes of the learned decision tree, the learning means obtains a distribution of each of the output feature vectors assigned to the leaf node and a distribution of each of combinations of the output feature vectors. Note that the value of a point in the frequency-axis direction and the change amount in the frequency-axis direction may be the logarithm of a frequency and a change amount of the logarithm of a frequency, respectively.

More preferably, for each of leaf nodes of the decision tree, the learning means creates a model of a distribution of each of the output feature vectors assigned to the leaf node by using a multidimensional single or Gaussian Mixture Model (GMM).

More preferably, the shift amounts for each of the points on the fundamental-frequency pattern of the target-speaker's voice are calculated on a frame or phoneme basis.

The linguistic information includes information on at least one of an accent type, a part of speech, a phoneme, and a mora position.

In order to solve the above problems, the second aspect of the present invention provides a fundamental-frequency-pattern generating apparatus that generates a fundamental-frequency pattern of a target speaker's voice on the basis of a fundamental-frequency pattern of a reference voice, the fundamental-frequency pattern representing a temporal change in a fundamental frequency, the fundamental-frequency-pattern generating apparatus including: associating means for associating a fundamental-frequency pattern of the reference voice of a learning text with a fundamental-frequency pattern of the target speaker's voice of the learning text by associating peaks and troughs of the fundamental-frequency pattern of the reference voice with corresponding peaks and troughs of the fundamental-frequency pattern of the target speaker's voice; shift-amount calculating means for calculating shift amounts of each of time-series points constituting the fundamental-frequency pattern of the target-speaker's voice from a corresponding one of time series points constituting the fundamental-frequency pattern of the reference voice in reference to a result of the association, the shift amounts including an amount of shift in the time-axis direction and an amount of shift in the frequency-axis direction; change-amount calculating means for calculating a change amount between each two adjacent time-series points of each of the calculated shift amounts; learning means for learning a decision tree by using input feature vectors which are linguistic information obtained by parsing the learning text, and by using output feature vectors including, as static feature vectors, the shift amounts and, as dynamic feature vectors, the change amounts of the respective shift amounts, and for obtaining distributions of the output feature vectors assigned to each of leaf nodes of the learned decision tree; distribution-sequence predicting means for inputting linguistic information obtained by parsing a synthesis text into the decision tree, and predicting distributions of the output feature vectors at the respective time-series points; optimization processing means for optimizing the shift amounts by obtaining a sequence of the shift amounts that maximizes a likelihood calculated from a sequence of the predicted distributions of the output feature vectors; and target-speaker's-fundamental-frequency pattern generating means for generating a fundamental-frequency pattern of the target-speaker's voice of the synthesis text by adding the sequence of the shift amounts to the fundamental-frequency pattern of the reference voice of the synthesis text. Note that the shift amount in the frequency-axis direction calculated by the shift-amount calculating means may be a shift amount of the logarithm of a frequency.

In order to solve the above problems, the third aspect of the present invention provides a fundamental-frequency-pattern generating apparatus that generates a fundamental-frequency pattern of a target speaker's voice on the basis of a fundamental-frequency pattern of a reference voice, the fundamental-frequency pattern representing a temporal change in a fundamental frequency, the fundamental-frequency-pattern generating apparatus including: associating means for associating a fundamental-frequency pattern of the reference voice of a learning text with a fundamental-frequency pattern of the target speaker's voice of the learning text by associating peaks and troughs of the fundamental-frequency pattern of the reference voice with corresponding peaks and troughs of the fundamental-frequency pattern of the target speaker's voice; shift-amount calculating means for calculating shift amounts of each of time-series points constituting the fundamental-frequency pattern of the target-speaker's voice from a corresponding one of time-series points constituting the fundamental-frequency pattern of the reference voice in reference to a result of the association, the shift amounts including an amount of shift in the time-axis direction and an amount of shift in the frequency-axis direction; change-amount calculating means for calculating a change amount between each two adjacent time-series points of each of the shift amounts, and calculating a change amount between each two adjacent time-series points on the fundamental-frequency pattern of the target-speaker's voice; learning means for learning a decision tree by using input feature vectors which are linguistic information obtained by parsing the learning text, and by using output feature vectors including, as static feature vectors, the shift amounts and values of the respective time-series points on the fundamental-frequency pattern of the target-speaker's voice, as well as including, as dynamic feature vectors, the change amounts of the respective shift amounts and the change amounts of the respective time-series points on the fundamental-frequency pattern of the target-speaker's voice and for obtaining, for each of leaf nodes of the learned decision tree, a distribution of each of the output feature vectors assigned to the leaf node and a distribution of each of combinations of the output feature vectors; distribution-sequence predicting means for inputting linguistic information obtained by parsing a synthesis text into the decision tree, and predicting a distribution of each of the output feature vectors and a distribution of each of the combinations of the output feature vectors, for each of the time-series points; optimization processing means for performing optimization processing by calculation in which values of each of the time-series points on the fundamental-frequency pattern of the target-speaker's voice in the time-axis direction and in the frequency-axis direction are obtained so as to maximize a likelihood calculated from a sequence of the predicted distributions of the respective output feature vectors and the predicted distribution of each of the combinations of the output feature vectors; and target-speaker's-fundamental-frequency pattern generating means for generating a fundamental-frequency pattern of the target-speaker's voice by ordering, in time, combinations of the value in the time-axis direction and the corresponding value in the frequency-axis direction which are obtained by the optimization processing means. Note that the shift amount in the frequency-axis direction calculated by the shift-amount calculating means may be a shift amount of the logarithm of a frequency. Similarly, the value of a point in the frequency-axis direction and the change amount in the frequency-axis direction may be the logarithm of a frequency and a change amount of the logarithm of a frequency, respectively.

The present invention has been described above as: the learning apparatus that learns shift amounts of a fundamental-frequency pattern of a target-speaker's voice from a fundamental-frequency pattern of a reference voice or that learns a combination of the shift amounts and the fundamental-frequency pattern of the target-speaker's voice; and the apparatus for generating a fundamental-frequency pattern of the target-speaker's voice by using a learning result from the learning apparatus. However, the present invention can also be understood as: a method for learning shift amounts of a fundamental-frequency pattern of a target-speaker's voice or for learning a combination of the shift amounts and the fundamental-frequency pattern of the target-speaker's voice; a method for generating a fundamental-frequency pattern of a target-speaker's voice; and a program for learning shift amounts of a fundamental-frequency pattern of a target-speaker's voice or for learning a combination of the shift amounts and the fundamental-frequency pattern of the target-speaker's voice, the methods and the program being executed by a computer.

Advantageous Effects of Invention

In the invention of the present application, to obtain a frequency pattern of a target-speaker's voice by correcting a frequency pattern of a reference voice, shift amounts of a fundamental-frequency pattern of the target-speaker's voice from a fundamental-frequency pattern of the reference voice are learned, or a combination of the shift amounts and the fundamental-frequency pattern of the target-speaker's voice is learned. To do this learning, the shift amounts are obtained by associating peaks and troughs of the fundamental-frequency pattern of the reference voice with the corresponding peaks and troughs of the fundamental-frequency pattern of the target-speaker's voice. This allows reproduction of features of the speaker which appear in waves of the form. Accordingly, features of a fundamental-frequency pattern of the target-speaker's voice generated using the learned shift amounts can be reproduced with high accuracy. Other advantageous effects of the present invention will be understood from the following descriptions of embodiments.

DESCRIPTION OF EMBODIMENTS

Some modes for carrying out the present invention will be described in detail below with the accompanying drawings. The following embodiments, however, do not limit the present invention according to the scope of claims. Not all the feature combinations described in the embodiments are essential to the solution means for the present invention. Note that the same components bear the same numbers throughout the description of the embodiments.

Figure 1:
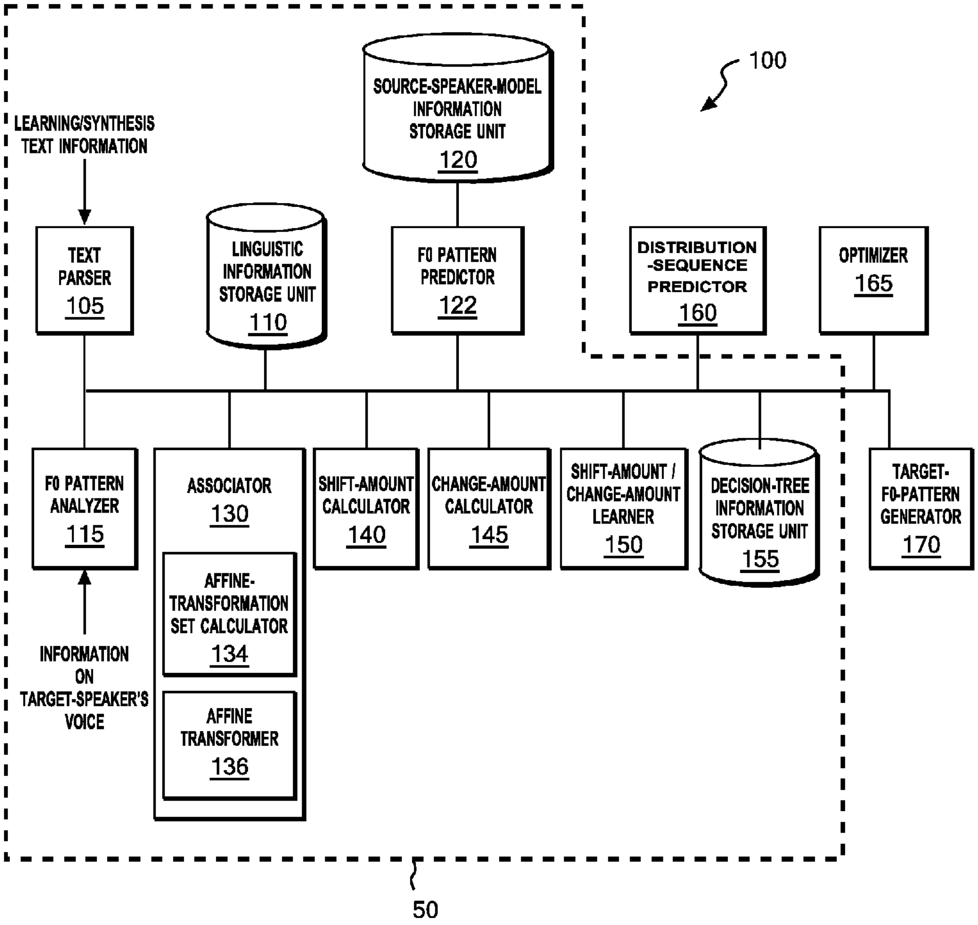
FIG. 1 shows functional configurations of a learning apparatus 50 and a fundamental-frequency-pattern generating apparatus 100 according to embodiments.

FIG. 1 shows the functional configurations of a learning apparatus 50 and a fundamental-frequency-pattern generating apparatus 100 according to the embodiments. Herein, a fundamental-frequency pattern represents a temporal change in a fundamental frequency, and is called an F0 pattern. The learning apparatus 50 according to the embodiments is a learning apparatus that learns either shift amounts from an F0 pattern of a reference voice to an F0 pattern of a target-speaker's voice, or a combination of the F0 pattern of the target-speaker's voice and the shift amounts thereof. Herein, the F0 pattern of a target-speaker's voice is called a target F0 pattern. In addition, the fundamental-frequency-pattern generating apparatus 100 according to the embodiments is a fundamental-frequency-pattern generating apparatus that includes the learning apparatus 50, and uses a learning result from the learning apparatus 50 to generate a target F0 pattern based on the F0 pattern of the reference voice. In the embodiments, an F0 pattern of a voice of a source speaker is used as the F0 pattern of a reference voice, and is called a source F0 pattern. Using a known technique, a statistical model of the source F0 pattern is obtained in advance for the source F0 pattern, based on a large amount of voice data of the source speaker.

As FIG. 1 shows, the learning apparatus 50 according to the embodiments includes a text parser 105, a linguistic information storage unit 110, an F0 pattern analyzer 115, a source-speaker-model information storage unit 120, an F0 pattern predictor 122, an associator 130, a shift-amount calculator 140, a change-amount calculator 145, a shift-amount/change-amount learner 150, and a decision-tree information storage unit 155. The associator 130 according to the embodiments further includes an affine-transformation set calculator 134 and an affine transformer 136.

Moreover, as FIG. 1 shows, the fundamental-frequency-pattern generating apparatus 100 according to the embodiments includes the learning apparatus 50 as well as a distribution-sequence predictor 160, an optimizer 165, and a target-F0-pattern generator 170. First to third embodiments will be described below. Specifically, what is described in the first embodiment is the learning apparatus 50 which learns shift amounts of a target F0 pattern. Then, what is described in the second embodiment is the fundamental-frequency-pattern generating apparatus 100 which uses a learning result from the learning apparatus 50 according to the first embodiment. In the fundamental-frequency-pattern generating apparatus 100 according to the second embodiment, learning processing is performed by creating a model of "shift amounts," and processing for generating a "target F0 pattern" is performed by first predicting "shift amounts" and then adding the "shift amounts" to a "source F0 pattern".

Lastly, what are described in the third embodiment are: the learning apparatus 50 which learns a combination of an F0 pattern of a target-speaker's voice and shift amounts thereof; and the fundamental-frequency-pattern generating apparatus 100 which uses a learning result from the learning apparatus 50. In the fundamental-frequency-pattern generating apparatus 100 according to the third embodiment, the learning processing is performed by creating a model of the combination of the "target F0 pattern" and the "shift amounts," and the processing for generating a "target F0 pattern" is performed through optimization, by directly referring to a "source F0 pattern."

First Embodiment

The text parser 105 receives input of a text and then performs morphological analysis, syntactic analysis, and the like on the inputted text to generate linguistic information. The linguistic information includes context information, such as accent types, parts of speech, phonemes, and mora positions. Note that, in the first embodiment, the text inputted to the text parser 105 is a learning text used for learning shift amounts from a source F0 pattern to a target F0 pattern.

The linguistic information storage unit 110 stores the linguistic information generated by the text parser 105. As already described, the linguistic information includes context information including at least one of accent types, parts of speech, phonemes, and mora positions.

The F0 pattern analyzer 115 receives input of information on a voice of a target speaker reading the learning text, and analyzes the voice information to obtain an F0 pattern of the target-speaker's voice. Since such F0-pattern analysis can be done using a known technique, a detailed description therefor is omitted. To give examples, tools using auto-correlation such as praat, a wavelet-based technique, or the like can be used. The F0 pattern analyzer 115 then passes the target F0 pattern obtained by the analysis to the associator 130 to be described later.

The source-speaker-model information storage unit 120 stores a statistical model of a source F0 pattern, which has been obtained by learning a large amount of voice data of the source speaker. The F0-pattern statistical model may be obtained using a decision tree, Hayashi's first method of quantification, or the like. A known technique is used for the learning of the F0-pattern statistical model, and it is assumed that the model is prepared in advance herein. To give examples, tools such as C4.5 and Weka can be used.

The F0 pattern predictor 122 predicts a source F0 pattern of the learning text, by using the statistical model of the source F0 pattern stored in the source-speaker-model information storage unit 120. Specifically, the F0 pattern predictor 122 reads the linguistic information on the learning text from the linguistic information storage unit 110 and inputs the linguistic information into the statistical model of the source F0 pattern. Then, the F0 pattern predictor 122 acquires a source F0 pattern of the learning text, outputted from the statistical model of the source F0 pattern. The F0 pattern predictor 122 passes the predicted source F0 pattern to the associator 130 to be described next.

The associator 130 associates the source F0 pattern of the learning text with the target F0 pattern corresponding to the same learning text by associating their corresponding peaks and corresponding troughs. A method called Dynamic Time Warping is known as a method for associating two different F0 patterns. In this method, each frame of one voice is associated with a corresponding frame of the other voice based on their cepstrums and F0 similarities. Defining the similarities allows F0 patterns to be associated based on their peak-trough shapes, or with emphasis on their cepstrums or absolute values. As a result of earnest studies to achieve more accurate association, the inventors of the present application have come up with a new method using other than the above method. The new method uses affine transformation in which a source F0 pattern is transformed into a pattern approximate to a target F0 pattern. Since Dynamic Time Warping is a known method, the embodiments employ association using affine transformation. Association using affine transformation is described below.

The associator 130 according to the embodiments using affine transformation includes the affine-transformation set calculator 134 and the affine transformer 136.

The affine-transformation set calculator 134 calculates a set of affine transformations used for transforming a source F0 pattern into a pattern having a minimum difference from a target F0 pattern. Specifically, the affine-transformation set calculator 134 sets an intonation phrase (inhaling section) as an initial value for a unit in processing an F0 pattern (processing unit) to obtain an affine transformation. Then, the affine-transformation set calculator 134 bisects the processing unit recursively until the affine-transformation set calculator 134 obtains an affine transformation that transforms a source F0 pattern into a pattern having a minimum difference from a target F0 pattern, and obtains an affine transformation for each of the new processing units. Eventually, the affine-transformation set calculator 134 obtains one or more affine transformations for each intonation phrase. Each of the affine transformations thus obtained is temporarily stored in a storage area, along with a processing unit used when the affine transformation is obtained and with information on a start point, on the source F0 pattern, of the processing range defined by the processing unit. A detailed procedure for calculating a set of affine transformations will be described later.

Figure 6:
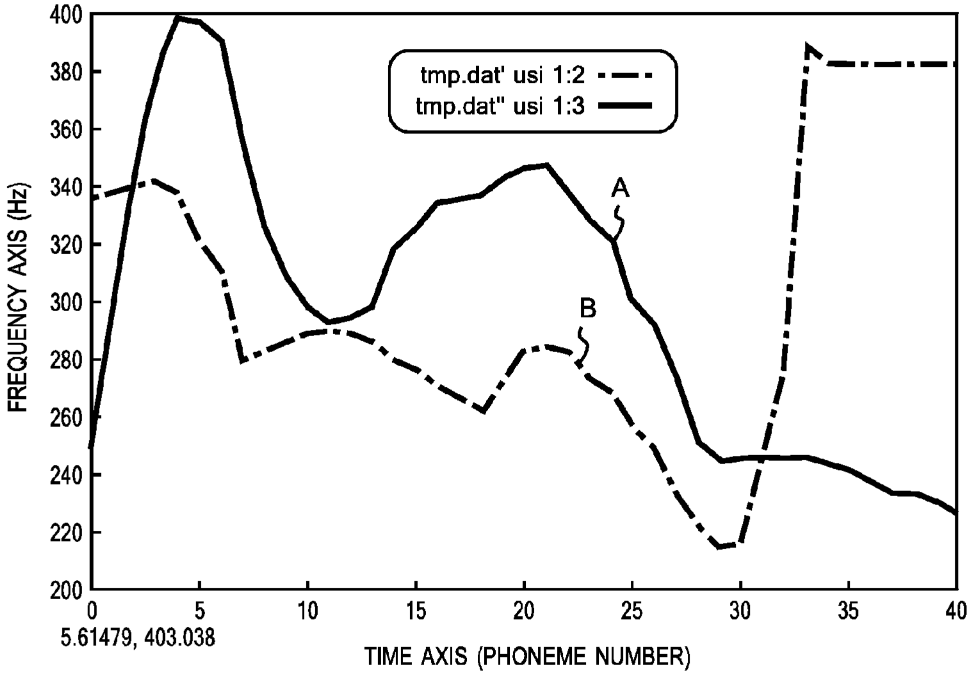
FIG. 6A is a diagram showing an example of an F0 pattern of a reference voice of a learning text and an example of an F0 pattern of a target-speaker's voice of the same learning text.
FIG. 6B is a diagram showing an example of affine transformations for respective processing units.
Figure 6:
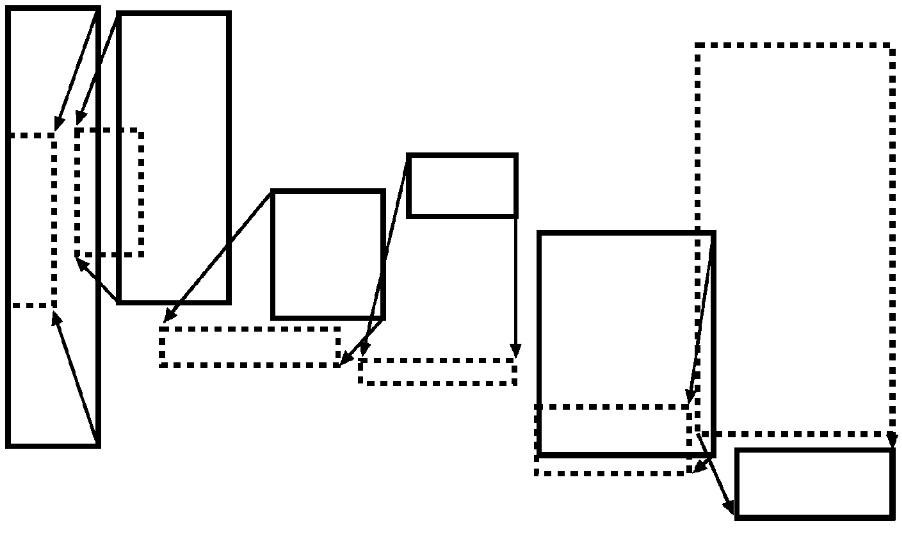
Figure 7:
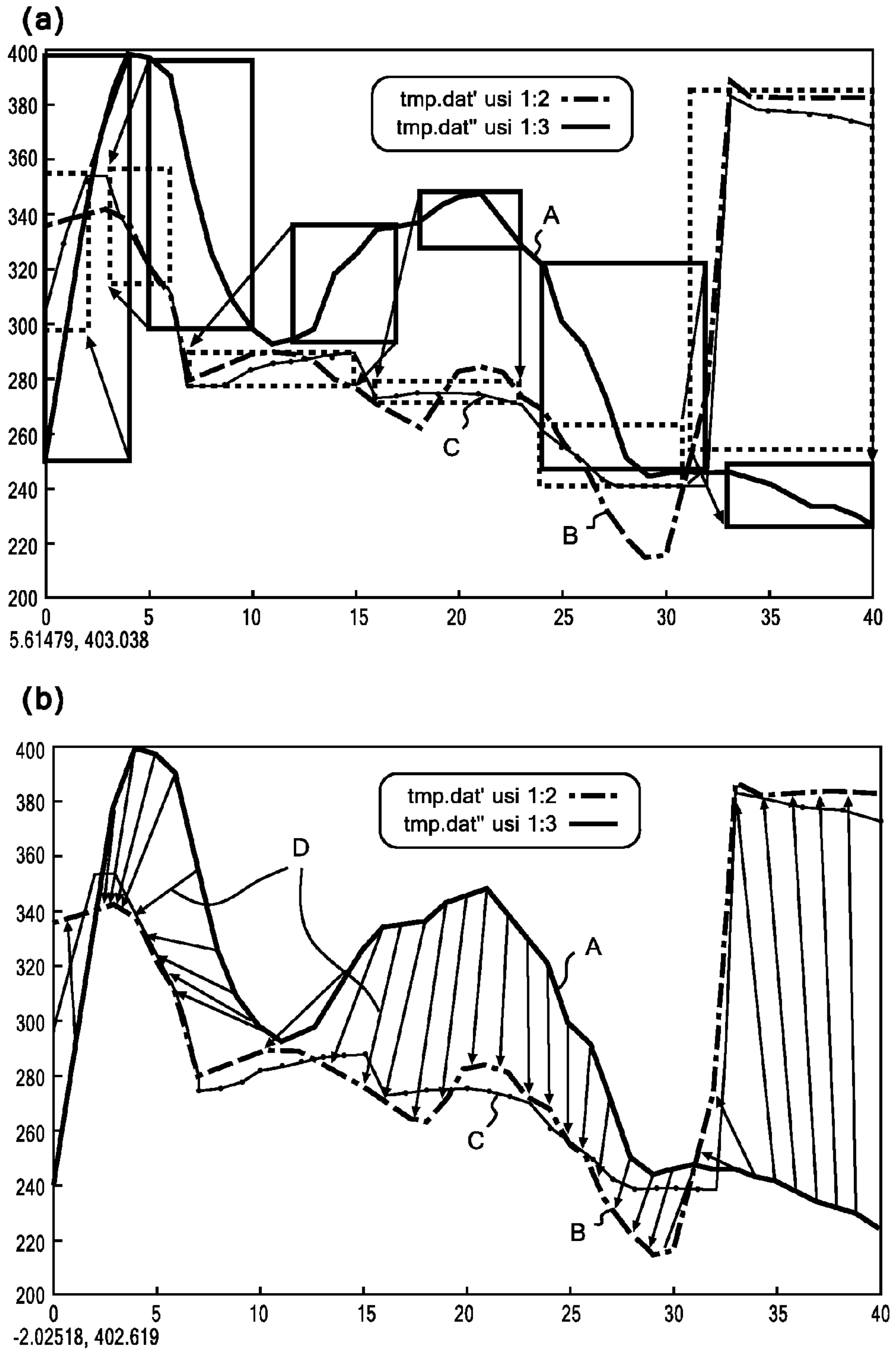
FIG. 7A is a diagram showing an F0 pattern obtained by transforming the F0 pattern of the reference voice shown in FIG. 6A by using the set of affine transformations shown in FIG. 6B.
FIG. 7B is a diagram showing shift amounts from the F0 pattern of the reference voice shown in FIG. 6A to the F0 pattern of the target-speaker's voice shown in FIG. 6A.

Referring to FIGS. 6A to 7B, a description is given of a set of affine transformations calculated by the affine-transformation set calculator 134. First, a graph in FIG. 6A shows an example of a source F0 pattern (see symbol A) and a target F0 pattern (see symbol B) that correspond to the same learning text. In the graph in FIG. 6A, the horizontal axis represents time, and the vertical axis represents frequency. The unit in the horizontal axis is a phoneme, and the unit in the vertical axis is Hertz (Hz). As FIG. 6A shows, the horizontal axis may use a phoneme number or a syllable number instead of a second. FIG. 6B shows a set of affine transformations used for transforming the source F0 pattern denoted by symbol A into a form approximate to the target F0 pattern denoted by symbol B. As FIG. 6B shows, the processing units of the respective affine transformations differ from each other, and an intonation phrase is the maximum value for each of the processing units.

FIG. 7A shows a post-transformation source F0 pattern (denoted by symbol C) obtained by actually transforming the source F0 pattern by using the set of affine transformations shown in FIG. 6B. As is clear from FIG. 7A, the form of the post-transformation source F0 pattern is approximate to the form of the target F0 pattern (see symbol B).

The affine transformer 136 associates each point on the source F0 pattern with a corresponding point on the target F0 pattern. Specifically, regarding the time axis and the frequency axis of the F0 pattern as the X-axis and the Y-axis, respectively, the affine transformer 136 associates each point on the source F0 pattern with a point on the target F0 pattern having the same X-coordinate as a point obtained by transforming the point on the source F0 pattern using the corresponding affine transformation. To be more specific, for each of the points $(X_s, Y_s)$ on the source F0 pattern, the affine transformer 136 transforms the X-coordinate $X_s$ by using an affine transformation obtained for the corresponding range, and thus obtains $X_t$. Then, the affine transformer 136 obtains a point $(X_t, Y_t)$ being on the target F0 pattern and having $X_t$ as its X-coordinate. The affine transformer 136 then associates the point $(X_t, Y_t)$ on the target F0 pattern with the point $(X_s, Y_s)$ on the source F0 pattern. A result obtained by the association is temporarily stored in a storage area. Note that the association may be performed on a frame basis or on a phoneme basis.

For each of the points $(X_t, Y_t)$ on the target F0 pattern, the shift-amount calculator 140 refers to the result of association by the associator 130 and thus calculates shift amounts $(x_d, y_d)$ from the corresponding point $(X_s, Y_s)$ on the source F0 pattern. Here, the shift amounts $(x_d, Y_d)=(X_t, Y_t)-(X_s, Y_s)$, and are an amount of shift in the time-axis direction and an amount of shift in the frequency-axis direction. The shift amount in the frequency-axis direction may be a value obtained by subtracting the logarithm of a frequency of a point on the source F0 pattern from the logarithm of a frequency of a corresponding point on the target F0 pattern. Note that the shift-amount calculator 140 passes the shift amounts calculated on a frame or phoneme basis to the change-amount calculator 145 and to the shift-amount/change-amount learner 150 to be described later.

Arrows (see symbol D) in FIG. 7B each show shift amounts from a point on the source F0 pattern (see symbol A) to a corresponding point on the target F0 pattern (see symbol B), the shift amounts having been obtained by referring to the result of association by the associator 130. Note that the results of association shown in FIG. 7B are obtained by using the set of affine transformations shown in FIGS. 6B and 7A.

For each of the shift amounts in the time-axis direction and in the frequency-axis direction calculated by the shift-amount calculator 140, the change-amount calculator 145 calculates a change amount between the shift amounts and shift amounts of an adjacent point. Such change amount is called a change amount of a shift amount below. Note that the change amount of a shift amount in the frequency-axis direction may be obtained using the logarithms of frequencies, as described above. In the embodiments, the change amount of a shift amount includes a primary dynamic feature vector and a secondary dynamic feature vector. The primary dynamic feature vector indicates an inclination of the shift amounts, whereas the secondary dynamic feature vector indicates a curvature of the shift amounts. The primary dynamic feature vector and the secondary dynamic feature vector of a given value V can generally be expressed as follows if approximation is done for three frames and a value of the ith frame or phoneme is V[i]:

$$\Delta V[i]=0.5*(V[i+1]-V[i-1])$$

$$\Delta^2 V[i]=0.5*(-V[i+1]+2V[i]-V[i-1]).$$

The change-amount calculator 145 passes the calculated primary and secondary dynamic feature vectors to the shift-amount/change-amount learner 150 to be described next.

The shift-amount/change-amount learner 150 learns a decision tree using the following information pieces as an input feature vector and an output feature vector. Specifically, the input feature vectors are the linguistic information on the learning text, which have been read from the linguistic information storage unit 110. The output feature vectors are the calculated shift amounts in the time-axis direction and in the frequency-axis direction. Note that, in learning of a decision tree, the output feature vectors should preferably include not only the shift amounts which are static feature vectors, but also change amounts of the shift amounts which are dynamic feature vectors. This makes it possible to predict an optimal shift-amount sequence for an entire phrase in a later step of generating a target F0 pattern by using the result obtained here.

In addition, for each leaf node of the decision tree, the shift-amount/change-amount learner 150 creates a model of a distribution for each of the output feature vector assigned to the leaf node, by using a multidimensional, single or Gaussian Mixture Model (GMM). As a result of the modeling, mean, variance, and covariance can be obtained for each output feature vector. Since there is a known technique for learning of a decision tree as described earlier, a detailed description therefor is omitted. To give examples, tools such as C4.5 and Weka can be used for the learning.

The decision-tree information storage unit 155 stores information on the decision tree and information on the distribution of each of the output feature vectors for each leaf node of the decision tree (the mean, variance, and covariance), which are learned and obtained by the shift-amount/change-amount learner 150. Note that, as described earlier, the output feature vectors in the embodiments includes a shift amount in the time-axis direction and a shift amount in the frequency-axis direction as well as change amounts of the respective shift amounts (the primary and secondary dynamic feature vectors).

Figure 2:
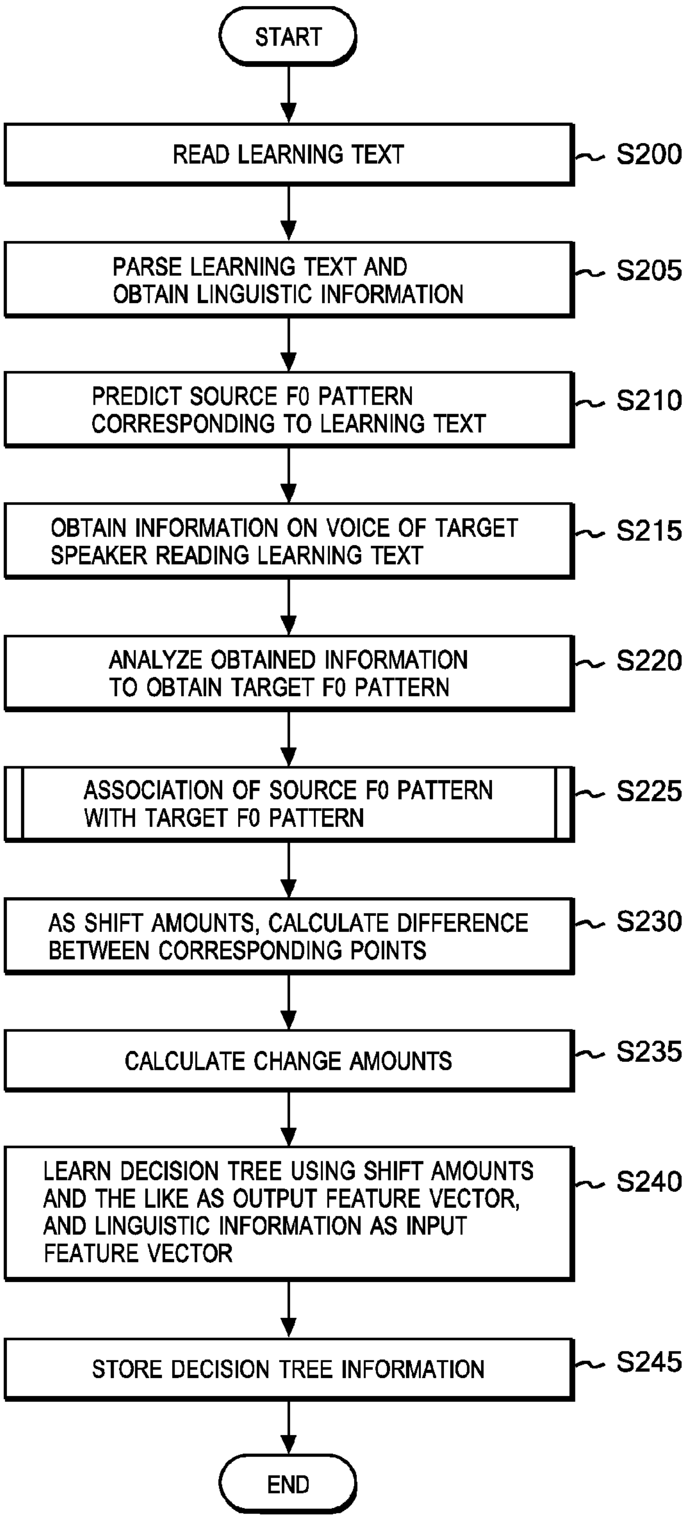
FIG. 2 is a flowchart showing an example of a flow of processing for learning shift amounts by the learning apparatus 50 according to the embodiments of the present invention.

Next, with reference to FIG. 2, a description is given of a flow of processing for learning shift amounts of a target F0 pattern by the learning apparatus 50 according to the first embodiment. Note that a "shift amount in the frequency-axis direction" and a "change amount of the shift amount in the frequency-axis direction" described in the following description include a shift amount based on the logarithm of a frequency and a change amount of the shift amount based on the logarithm of a frequency, respectively. FIG. 2 is a flowchart showing an example of an overall flow of processing for learning shift amounts from the source F0 pattern to the target F0 pattern, which is executed by a computer functioning as the learning apparatus 50. The processing starts in Step 200, and the learning apparatus 50 reads a learning text provided by a user. The user may provide the learning text to the learning apparatus 50 through, for example, an input device such as a keyboard, a recording-medium reading device, or a communication interface.

The learning apparatus 50 parses the learning text thus read, to obtain linguistic information including context information such as accent types, phonemes, parts of speech, and mora positions (Step 205). Then, the learning apparatus 50 reads information on a statistical model of a source F0 pattern from the source-speaker-model information storage unit 120, inputs the obtained linguistic information into this statistical model, and acquires, as an output therefrom, a source F0 pattern of the learning text (Step 210).

The learning apparatus 50 also acquires information on a voice of a target speaker reading the same learning text (Step 215). The user may provide the information on the target-speaker's voice to the learning apparatus 50 through, for example, an input device such as a microphone, a recording-medium reading device, or a communication interface. The learning apparatus 50 then analyzes the information on the obtained target-speaker's voice, and thereby obtains an F0 pattern of the target speaker, namely, a target F0 pattern (Step 220).

Next, the learning apparatus 50 associates the source F0 pattern of the learning text with the target F0 pattern of the same learning text by associating their corresponding peaks and corresponding troughs, and stores the correspondence relationships in a storage area (Step 225). A detailed description of a processing procedure for the association will be described later with reference to FIGS. 3 and 4. Subsequently, for each of time-series points constituting the target F0 pattern, the learning apparatus 50 refers to the stored correspondence relationships, and thereby obtains shift amounts of the target F0 pattern in the time-axis direction and in the frequency-axis direction, and stores the obtained shift amounts in a storage area (Step 230). Specifically, each shift amount is an amount of shift from one of time-series points constituting the source F0 pattern to a corresponding one of time-series points constituting the target F0 pattern, and accordingly, is a difference, in the time-axis direction or in the frequency-axis direction, between the corresponding time-series points.

Moreover, for each of the time-series points, the learning apparatus 50 reads the obtained shift amounts in the time-axis direction and in the frequency-axis direction from the storage area, calculates change amounts of the respective shift amounts in the time-axis direction and in the frequency-axis direction, and stores the calculated change amounts (Step 235). Each change amount of the shift amount includes a primary dynamic feature vector and a secondary dynamic feature vector.

Lastly, the learning apparatus 50 learns a decision tree using the following information pieces as an input feature vector and an output feature vector (Step 240). Specifically, the input feature vectors are the linguistic information obtained by parsing the learning text, and the output feature vectors are static feature vectors including the shift amounts in the time-axis direction and in the frequency-axis direction and the primary and secondary dynamic feature vectors that correspond to the static feature vectors. Then, for each of leaf nodes of the decision tree thus learned, the learning apparatus 50 obtains distributions of the output feature vectors assigned to that leaf node, and stores information on the learned decision tree and information on the distributions for each of the leaf nodes, in the decision-tree information storage unit 155 (Step 245). Then, the processing ends.

Now, a description is given of a method with which the inventors of the present application have newly come up for recursively obtaining a set of affine transformations for transforming a source F0 pattern into a form approximate to a target F0 pattern.

In this method, each of a source F0 pattern and a target F0 pattern that correspond to the same learning text is divided in intonation phrases, and optimal one or more affine transformations are obtained for each of the processing ranges obtained by the division. Here, in both of the F0 patterns, an affine transformation is obtained independently for each processing range. An optimal affine transformation is an affine transformation that transforms a source F0 pattern into a pattern having a minimum error from a target F0 pattern in a processing range. One affine transformation is obtained for each processing unit.

Specifically, for example, after one processing unit is bisected to make two smaller processing units, one optimal affine transformation is newly obtained for each of the two new processing units. To determine which affine transformation is an optimal affine transformation, a comparison is made between before and after the bisection of the processing unit. Specifically, what is compared is the sum of squares of an error between a post-affine-transformation source F0 pattern and a target F0 pattern. (The sum of squares of an error after the bisection of the processing unit is obtained by adding the sum of squares of an error for the former part obtained by the bisection to the sum of squares of an error for the latter part obtained by the bisection.) Note that, among all the combinations of a point that can bisect a source F0 pattern and a point that can bisect a target F0 pattern, the comparison is made only on a combination of two points that would make the sum of squares of an error minimum, in order to avoid inefficiency.

If the sum of squares of an error after the bisection is not determined as being sufficiently small, the affine transformation obtained for the processing unit before the bisection is an optimal affine transformation. Accordingly, the above processing sequence is performed recursively until it is determined that the sum of squares of an error after the bisection is not sufficiently small or that the processing unit after the bisection is not sufficiently large.

Figure 3:
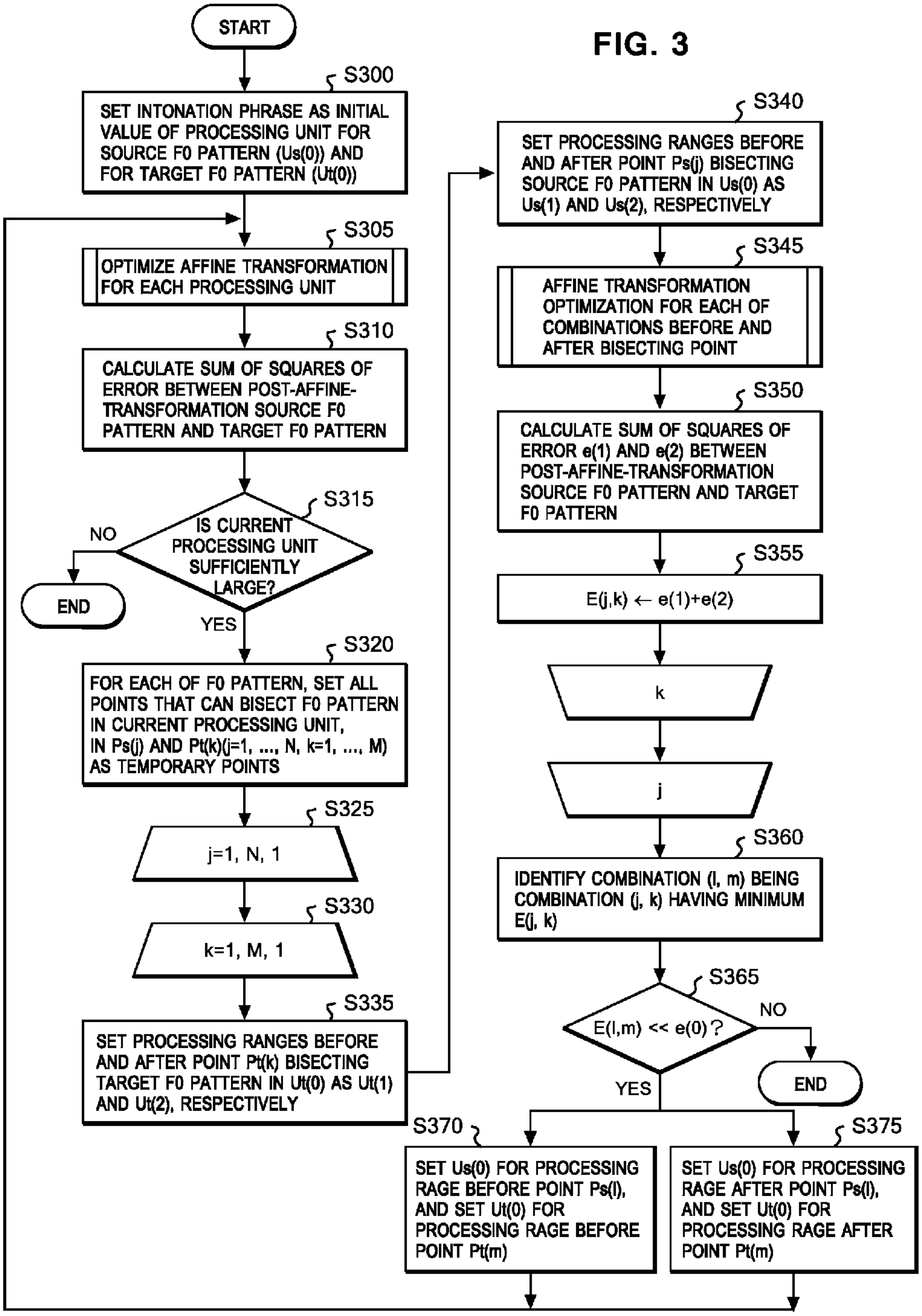
FIG. 3 is a flowchart showing an example of a flow of processing for calculating a set of affine transformations, the processing being performed in a first half of the association of F0 patterns in Step 225 of the flowchart shown in FIG. 2.
Figure 4:
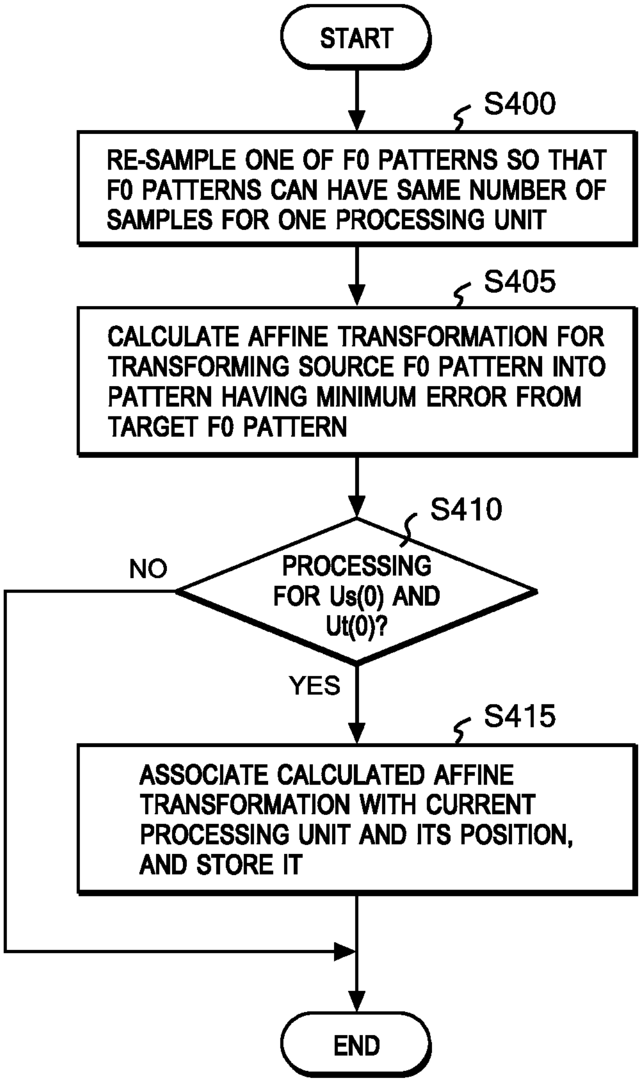
FIG. 4 is a flowchart showing details of processing for affine-transformation optimization performed in Steps 305 and 345 of the flowchart shown in FIG. 3.
Figure 5:
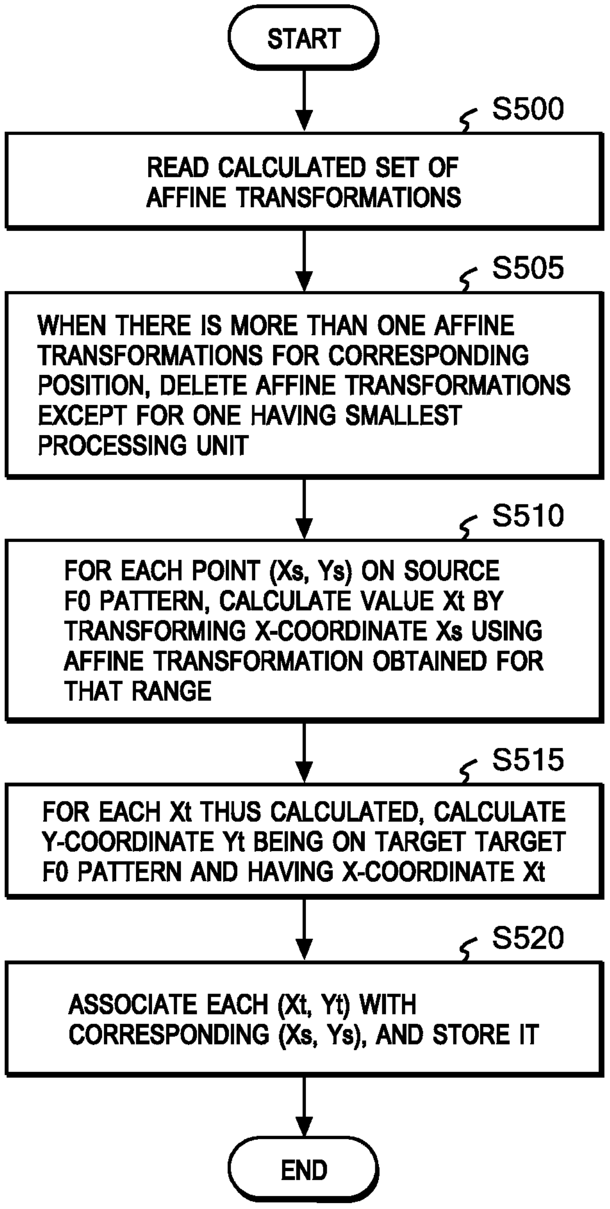
FIG. 5 is a flowchart showing an example of a flow of processing for associating F0 patterns by using the set of affine transformations, the processing being performed in a second half of the association of F0 patterns in Step 225 of the flowchart shown in FIG. 2.

Next, with reference to FIGS. 3 to 5, a detailed description is given of processing for associating a source F0 pattern with a target F0 pattern, both corresponding to the same learning text. FIG. 3 is a flowchart showing an example of a flow of processing for calculating a set of affine transformations, which is performed by the affine-transformation set calculator 134. Note that the processing for calculating a set of affine transformations shown in FIG. 3 is performed for each processing unit of both of the F0 patterns divided on an intonation-phrase basis. FIG. 4 is a flowchart showing an example of a flow of processing for optimizing an affine transformation, which is performed by the affine-transformation set calculator 134. FIG. 4 shows details of the processing performed in Steps 305 and 345 in the flowchart shown in FIG. 3.

FIG. 5 is a flowchart showing an example of a flow of processing for affine transformation and association, which is performed by the affine transformer 136. The processing shown in FIG. 5 is performed after the processing shown in FIG. 3 is performed on all the processing ranges. Note that FIGS. 3 to 5 show details of the processing performed in Step 225 of the flowchart shown in FIG. 2.

In FIG. 3, the processing starts in Step 300. In Step 300, the affine-transformation set calculator 134 sets an intonation phrase as an initial value of a processing unit for a source F0 pattern ($U_s(\mathbf{0})$) and as an initial value of a processing unit for a target F0 pattern ($U_t(\mathbf{0})$). Then, the affine-transformation set calculator 134 obtains an optimal affine transformation for a combination of the processing unit $U_s(\mathbf{0})$ and the processing unit ($U_t(\mathbf{0})$) (Step 305). Details of the processing for affine transformation optimization will be described later with reference to FIG. 4. After the affine transformation is obtained, the affine-transformation set calculator 134 transforms the source F0 pattern by using the affine transformation thus calculated, and obtains the sum of squares of an error between the post-transformation source F0 pattern and the target F0 pattern (the sum of squares of an error here is denoted as e(0)) (Step 310).

Next, the affine-transformation set calculator 134 determines whether the current processing unit is sufficiently large or not (Step 315). When it is determined that the current processing unit is not sufficiently large (Step 315: NO), the processing ends. On the other hand, when it is determined that the current processing unit is sufficiently large (Step 315: YES), the affine-transformation set calculator 134 acquires, as temporary points, all the points on the source F0 pattern in $U_s(\mathbf{0})$ that can be used to bisect $U_s(\mathbf{0})$ and all the points on the target F0 pattern in $U_t(\mathbf{0})$ that can be used to bisect $U_t(\mathbf{0})$, and stores each of the acquired points of the source F0 pattern in $P_s(j)$ and each of the acquired points of the target F0 pattern in $P_t(k)$ (Step 320). Here, the variable j takes an integer of 1 to N, and the variable k takes an integer of 1 to M.

Next, the affine-transformation set calculator 134 sets an initial value of each of the variable j and the variable k to 1 (Step 325, Step 330). Then, by the affine-transformation set calculator 134, processing ranges before and after a point $P_t(\mathbf{1})$ bisecting the target F0 pattern in $U_t(\mathbf{0})$ are set as $U_t(\mathbf{1})$ and $U_t(\mathbf{2})$, respectively (Step 335). Similarly, the affine-transformation set calculator 134 sets processing ranges before and after a point $P_s(\mathbf{1})$ bisecting the source F0 pattern in $U_s(\mathbf{0})$ as $U_s(\mathbf{1})$ and $U_s(\mathbf{2})$, respectively (Step 340). Then, the affine-transformation set calculator 134 obtains an optimal affine transformation for each of a combination of $U_t(l)$ and $U_s(\mathbf{1})$ and a combination of $U_t(\mathbf{2})$ and $U_s(\mathbf{2})$ (Step 345). Details of the processing for affine transformation optimization will be described later with reference to FIG. 4.

After obtaining affine transformations for the respective combinations, the affine-transformation set calculator 134 transforms the source F0 patterns of the combinations by using the affine transformations thus calculated, and obtains the sums of squares of an error e(1) and e(2) between the post-transformation source F0 pattern and the target F0 pattern in the respective combinations (Step 350). Here, e(1) is the sum of squares of an error obtained for the first combination obtained by the bisection, and e(2) is the sum of squares of an error obtained for the second combination obtained by the bisection. The affine-transformation set calculator 134 stores the sum of the calculated sums of squares of an error e(1) and e(2), in E(1, 1). The processing sequence described above, namely, the processing from Steps 325 to 355 is repeated until a final value of the variable j is N and a final value of the variable k is M, the initial values and increments of the variables j and k each being 1. Note that the variables j and k are incremented independently from each other.

Upon satisfaction of the condition to end the loop, the processing proceeds to Step 360, where the affine-transformation set calculator 134 identifies a combination (l, m) being a combination (j, k) having the minimum E(j, k). Then, the affine-transformation set calculator 134 determines whether E(l, m) is sufficiently smaller than the sum of squares of an error e(0) obtained before the bisection of the processing unit (Step 365). When E(l, m) is not sufficiently small (Step 365: NO), the processing ends. On the other hand, when E(l, m) is sufficiently smaller than the sum of squares of an error e(0) (Step 365: YES), the processing proceeds to two different steps, namely, Steps 370 and 375.

In Step 370, the affine-transformation set calculator 134 sets the processing range before the point $P_s(l)$ bisecting the source F0 pattern in $U_s(\mathbf{0})$ as a new initial value $U_s(\mathbf{0})$ of a processing range for the source F0 pattern, and sets the processing range before the point $P_t(m)$ bisecting the target F0 pattern in $U_t(\mathbf{0})$ as a new initial value $U_t(\mathbf{0})$ of a processing range for the source F0 pattern. Similarly, in Step 375, the affine-transformation set calculator 134 sets the processing range after the point $P_s(l)$ bisecting the source F0 pattern in $U_s(\mathbf{0})$ as a new initial value $U_s(\mathbf{0})$ of a processing range for the source F0 pattern, and sets the processing range after the point $P_t(m)$ bisecting the target F0 pattern in $U_t(\mathbf{0})$ as a new initial value $U_t(\mathbf{0})$ of a processing range for the target F0 pattern. From Steps 370 and 375, the processing returns to Step 305 to recursively perform the above-described processing sequence independently.

Next, the processing for optimizing an affine transformation is described with reference to FIG. 4. In FIG. 4, the processing starts in Step 400, and the affine-transformation set calculator 134 re-samples one of F0 patterns so that the F0 patterns can have the same number of samples for one processing unit. Then, the affine-transformation set calculator 134 calculates an affine transformation that transforms the source F0 pattern so that an error between the source F0 pattern and the target F0 pattern may be minimum (Step 405). How to calculate such affine transformation is described below.

Assume that the X-axis represents time and the Y-axis represents frequency, and that one scale mark on the time axis corresponds to one frame or phoneme. Here, $(U_{xi}, U_{yi})$ denotes the (X, Y) coordinates of a time-series point that constitutes the source F0 pattern in a range targeted for association, and $(V_{xi}, V_{yi})$ denotes the (X, Y) coordinates of a time-series point that constitutes the target F0 pattern in that target range. Note that the variable i takes an integer of 1 to N. Since resampling has already been done, the source and target F0 patterns have the same number of time-series points. Further, the time-series points are equally spaced in the X-axis direction. What is to be achieved here is to obtain, using Expression 1 given below, transformation parameters (a, b, c, d) used for transforming $(U_{xi}, U_{yi})$ into $(W_{xi}, W_{yi})$ approximate to $(V_{xi}, V_{yi})$.

$$\begin{pmatrix} w_{x,i} \\ w_{y,i} \end{pmatrix} = \begin{pmatrix} a & 0 \\ 0 & b \end{pmatrix} \begin{pmatrix} u_{x,i} - u_{x,1} \\ u_{y,i} \end{pmatrix} + \begin{pmatrix} c \\ d \end{pmatrix} \quad \text{[Expression 1]}$$

First, a discussion is given as to an X component. Since the X-coordinate $V_{x1}$ which is the leading point needs to coincide with the X-coordinate $W_{x1}$, the parameter c is automatically found. Specifically, $c=V_{x1}$. Similarly, since the X-coordinates of the last points need to coincide with each other, too, the parameter a is found as follows.

$$a = \frac{v_{x,n} - v_{x,1}}{u_{x,n} - u_{x,1}} \quad \text{[Expression 2]}$$

Next, a discussion is given as to a Y component. The sum of squares of an error between the Y-coordinate $W_{yi}$ obtained by transformation and the Y-coordinate $V_{yi}$, of a point on the target F0 pattern is defined as the following expression.

$$E = \sum_{i=1}^{n} (w_{y,i} - v_{y,i})^2 = \sum_{i=1}^{n} \{(bu_{y,i} + d) - v_{y,i}\}^2 \quad \text{[Expression 3]}$$

By solving the partial differential equation, the parameters b and d that allow the sum of squares of an error to be minimum are obtained by the following expressions, respectively.

$$b = \frac{\sum_{i=1}^{n} u_{y,i} v_{y,i} - \frac{1}{n} \sum_{i=1}^{n} u_{y,i} \sum_{i=1}^{n} v_{y,i}}{\sum_{i=1}^{n} u_{y,i}^2 - \frac{1}{n} \left( \sum_{i=1}^{n} u_{y,i} \right)^2} \quad \text{[Expression 4]}$$

$$d = \frac{\sum_{i=1}^{n} v_{y,i} - b \sum_{i=1}^{n} u_{y,i}}{n+1}. \quad \text{[Expression 5]}$$

In the manner described above, an optimal affine transformation is obtained for a processing unit.

Referring back to FIG. 4, the processing proceeds from Step 405 to Step 410, and the affine-transformation set calculator 134 determines whether or not the processing performed currently for obtaining an optimal affine transformation is for the processing units $U_s(\mathbf{0})$ and $U_t(\mathbf{0})$. If the current processing is not for the processing units $U_s(\mathbf{0})$ and $U_t(\mathbf{0})$ (Step 410: NO), the processing ends. On the other hand, if the current processing is for the processing units $U_s(\mathbf{0})$ and $U_t(\mathbf{0})$ (Step 410: YES), the affine-transformation set calculator 134 associates the affine transformation calculated in Step 405 with the current processing unit and with the current processing position on the source F0 pattern, and temporarily stores the result in the storage area (Step 415). Then, the processing ends.

With reference to FIG. 5, a description is given next of the processing for affine transformation and association, which is performed by the affine transformer 136. In FIG. 5, the processing starts in Step 500, and the affine transformer 136 reads the set of affine transformations calculated and stored by the affine-transformation set calculator 134. When there is more than one affine transformations for the corresponding processing position, only an affine transformation having the smallest processing unit is saved, and the rest is deleted (Step 505).

Thereafter, for each of the points $(X_s, Y_s)$ that constitute the source F0 pattern, the affine transformer 136 transforms the X-coordinate $X_s$ by using the affine transformation obtained for that processing range, thereby obtaining a value $X_t$ (Step 510). Note that the X-axis and the Y-axis represent time and frequency, respectively. Then, for each $X_t$ thus calculated, the affine transformer 136 obtains the Y-coordinate $Y_t$ which is on the target F0 pattern and which corresponds to the X-coordinate $X_t$ (Step 515). Finally, the affine transformer 136 associates each point $(X_t, Y_t)$ thus calculated, with a point $(X_s, Y_s)$ from which the point $(X_t, Y_t)$ has been obtained, and stores the result in the storage area (Step 520). Then, the processing ends.

Second Embodiment

Next, referring back to FIG. 1, a description is given of the functional configuration of the fundamental-frequency-pattern generating apparatus 100 that uses a learning result from the learning apparatus 50 according to the first embodiment. The constituents of the learning apparatus 50 included in the fundamental-frequency-pattern generating apparatus 100 are the same as those described in the first embodiment, and are therefore not described here. However, the text parser 105 being one of the constituents of the learning apparatus 50 included in the fundamental-frequency-pattern generating apparatus 100 further receives, as an input text, a synthesis text for which an F0 pattern of a target speaker is to be generated. Accordingly, the linguistic information storage unit 110 stores linguistic information on the learning text and linguistic information on the synthesis text.

Moreover, the F0 pattern predictor 122 operating in the synthesis mode uses the statistical model of the source F0 pattern stored in the source-speaker-model information storage unit 120 to predict a source F0 pattern corresponding to the synthesis text. Specifically, the F0 pattern predictor 122 reads the linguistic information on the synthesis text from the linguistic information storage unit 110, and inputs the linguistic information into the statistical model of the source F0 pattern. Then, as an output from the statistical model of the source F0 pattern, the F0 pattern predictor 122 acquires a source F0 pattern corresponding to the synthesis text. The F0 pattern predictor 122 then passes the predicted source F0 pattern to the target-F0-pattern generator 170 to be described later.

The distribution-sequence predictor 160 inputs the linguistic information on the synthesis text into the learned decision tree, and thereby predicts distributions of output feature vectors for each time-series point. Specifically, from the decision-tree information storage unit 155, the distribution-sequence predictor 160 reads information on the decision tree and information on distributions (mean, variance, and covariance) of output feature vectors for each leaf node of the decision tree. In addition, from the linguistic information storage unit 110, the distribution-sequence predictor 160 reads the linguistic information on the synthesis text. Then, the distribution-sequence predictor 160 inputs the linguistic information on the synthesis text into the read decision tree, and acquires, as an output therefrom, distributions (mean, variance, and covariance) of output feature vectors for each time-series point.

Note that, in the embodiments, the output feature vectors include a static feature vector and a dynamic feature vector thereof, as described earlier. The static feature vector includes a shift amount in the time-axis direction and a shift amount in the frequency-axis direction. Moreover, the dynamic feature vector corresponding to the static feature vector includes a primary dynamic feature vector and a secondary dynamic feature vector. The distribution-sequence predictor 160 passes a sequence of the predicted distributions (mean, variance, and covariance) of output feature vectors, namely, a mean vector and a variance-covariance matrix of each output feature vector, to the optimizer 165 to be described next.

The optimizer 165 optimizes shift amounts by obtaining a shift-amount sequence that maximizes a likelihood calculated from the sequence of the distributions of the output feature vectors. A procedure for the optimization processing is described below. The procedure for the optimization processing described below is performed separately for a shift amount in the time-axis direction and a shift amount in the frequency-axis direction.

First, let us denote the variable of an output feature value as $C_i$, where i represents a time index. Accordingly, in a case of the optimization processing for the time-axis direction, $C_i$ is a shift amount of the i-th frame or i-th phoneme in the time-axis direction. Similarly, in a case of the optimization processing for the frequency-axis direction, $C_i$ is a shift amount of the logarithm of a frequency of the i-th frame or i-th phoneme. Further, the primary dynamic feature value and the secondary dynamic feature value that correspond to $C_i$ are represented by $\Delta C_i$ and $\Delta^2 C_i$, respectively. An observation vector o having, those static and dynamic feature values is defined as follows.

[Expression 6]

$$o = \begin{bmatrix} \vdots \\ [c_{i-1}, \Delta c_{i-1}, \Delta^2 c_{i-1}]^T \\ [c_i, \Delta c_i, \Delta^2 c_i]^T \\ [c_{i+1}, \Delta c_{i+1}, \Delta^2 c_{i+1}]^T \\ \vdots \end{bmatrix}$$

As described in the first embodiment, $\Delta C_i$ and $\Delta^2 C_i$ are simple linear sums of $C_i$. Accordingly, the observation vector can be expressed as o=Wc by using a feature vector c having $C_i$ of all the time points. Here, the matrix W satisfies the following expression.

[Expression 7]

$$W = \{w_{i,j}\}$$

$$= \begin{bmatrix} & \vdots & \vdots & \vdots & \\ \cdots & w_{i3+1,j-1}, & w_{i3+1,j}, & w_{i3+1;j+1}, & \cdots \\ \cdots & w_{i3+2,j-1}, & w_{i3+2,j}, & w_{i3+2,j+1}, & \cdots \\ \cdots & w_{i3+3,j-1}, & w_{i3+3,j}, & w_{i3+3,j+1}, & \cdots \\ & \vdots & \vdots & \vdots & \end{bmatrix}$$

$$= \begin{bmatrix} & \vdots & \vdots & \vdots & \\ \cdots & 0, & 1, & 0, & \cdots \\ \cdots & -1/2, & 0, & 1/2, & \cdots \\ \cdots & -1, & 2, & -1, & \cdots \\ & \vdots & \vdots & \vdots & \end{bmatrix}$$

Note that $i3 = 3(i-1)$.

Assume that the sequence $\lambda_o$ of the distributions of the observation vector o has been predicted by the distribution-sequence predictor 160. Then, since the components of the observation vector o conform to a Gaussian distribution in the embodiments, the likelihood of the observation vector o with respect to the predicted distribution sequence $\lambda_o$ of the observation vector o can be expressed as the following expression.

[Expression 8]

$$\begin{aligned} L_1 &\equiv \log P_r(o \mid \lambda_o) \\ &= \log P_r(Wc \mid \lambda_o) \\ &= \log P_r(Wc; N(\mu_o, \Sigma_o)) \\ &= -\frac{(Wc-\mu_o)^T \Sigma_o^{-1}(Wc-\mu_o)}{2} + \text{const.}, \end{aligned}$$

In the above expression, $\mu_o$ and $\Sigma_o$ are a mean vector and a variance-covariance matrix, respectively, and are the contents of the distribution sequence $\lambda_o$ calculated by the distribution-sequence predictor 160. Moreover, the output feature vector c for maximizing $L_1$ satisfies the following expression.

[Expression 9]

$$\frac{\partial L_1}{\partial c} = \frac{W^T \Sigma_o^{-1}(Wc-\mu_o)}{2} = 0$$

This equation can be solved for the feature vector c by using repeated calculation such as Cholesky decomposition or steepest descent method. Accordingly, an optimal solution can be found for each of a shift amount in the time-axis direction and a shift amount in the frequency-axis direction. As described, from the sequence of distributions of the output feature vectors, the optimizer 165 obtains a most-likely sequence of shift amounts in the time-axis direction and in the frequency-axis direction. The optimizer 165 then passes the calculated sequence of the shift amounts in the time-axis direction and in the frequency-axis direction to the target-F0-pattern generator 170 described next.

The target-F0-pattern generator 170 generates a target F0 pattern corresponding to the synthesis text by adding the sequence of the shift amounts in the time-axis direction and the sequence of the shift amounts in the frequency-axis direction to the source F0 pattern corresponding to the synthesis text.

Figure 8:
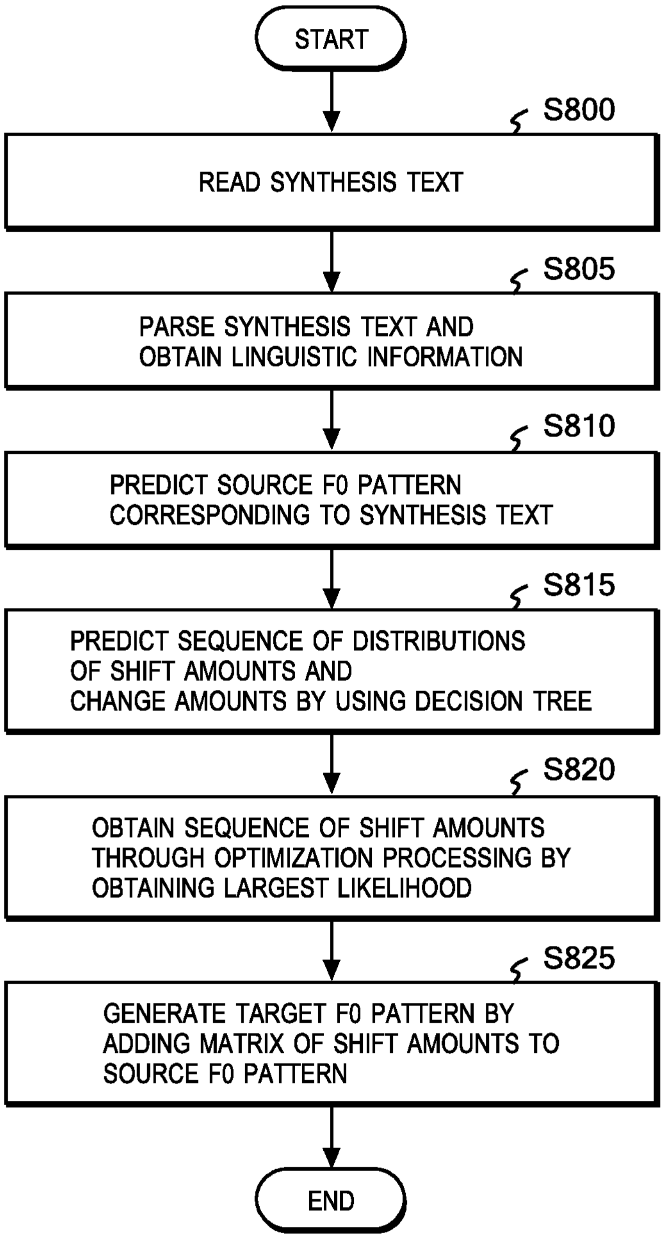
FIG. 8 is a flowchart showing an example of a flow of processing for generating a fundamental-frequency pattern, performed by the fundamental-frequency-pattern generating apparatus 100 according to the embodiments of the present invention.

With reference to FIG. 8, a description is given next of a flow of the processing for generating a target F0 pattern, which is performed by the fundamental-frequency-pattern generating apparatus 100 according to the second embodiment of the invention. FIG. 8 is a flowchart showing an example of an overall flow of the processing for generating a target F0 pattern corresponding to a source F0 pattern, which is performed by a computer functioning as the fundamental-frequency-pattern generating apparatus 100. The processing starts in Step 800, and the fundamental-frequency-pattern generating apparatus 100 reads a synthesis text provided by a user. The user may provide the synthesis text to the fundamental-frequency-pattern generating apparatus 100 through, for example, an input device such as a keyboard, a recording-medium reading device, or a communication interface.

The fundamental-frequency-pattern generating apparatus 100 parses the synthesis text thus read, to obtain linguistic information including context information such as accent types, phonemes, parts of speech, and mora positions (Step 805). Then, the fundamental-frequency-pattern generating apparatus 100 reads information on a statistical model of the source F0 pattern from the source-speaker-model information storage unit 120, inputs the obtained linguistic information into this statistical model, and acquires, as an output therefrom, a source F0 pattern corresponding to the synthesis text (Step 810).

Subsequently, the fundamental-frequency-pattern generating apparatus 100 reads information on a decision tree from the decision-tree information storage unit 155, inputs the linguistic information on the synthesis text into this decision tree, and acquires, as an output therefrom, a distribution sequence of shift amounts in the time-axis direction and in the frequency-axis direction and change amounts of the shift amounts (including primary and secondary dynamic feature vectors) (Step 815). Then, the fundamental-frequency-pattern generating apparatus 100 obtains a shift-amount sequence that maximizes the likelihood calculated from the distribution sequence of the shift amounts and the change amounts of the shift amounts thus obtained, and thereby acquires an optimized shift-amount sequence (Step 820).

Finally, the fundamental-frequency-pattern generating apparatus 100 adds the optimized shift amounts in the time-axis direction and in the frequency-axis direction to the source F0 pattern corresponding to the synthesis text, and thereby generates a target F0 pattern corresponding to the same synthesis text (Step 825). Then, the processing ends.

Figure 9:
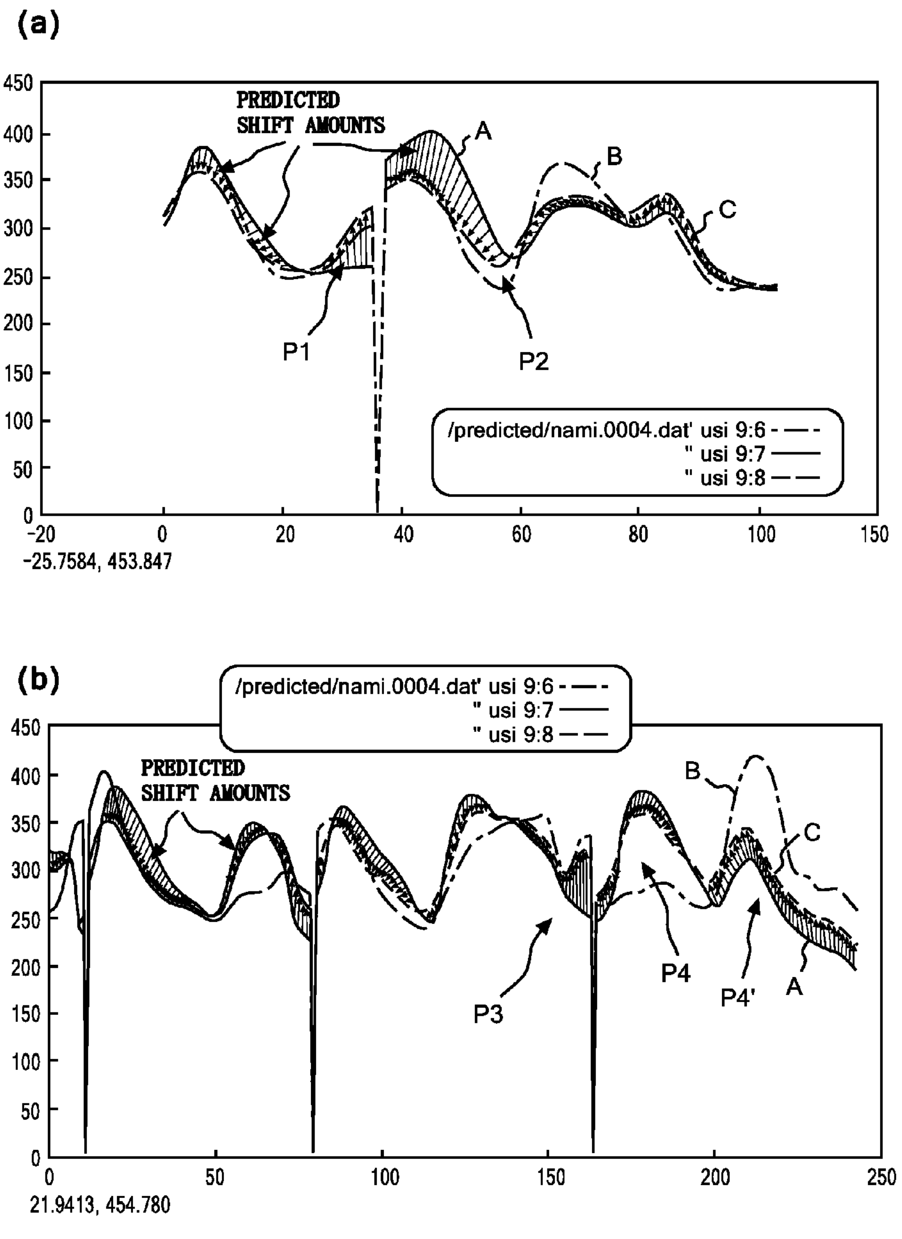
FIG. 9A shows a fundamental-frequency pattern of a target speaker obtained using the present invention.
FIG. 9B shows another fundamental-frequency pattern of a target speaker obtained using the present invention.

FIGS. 9A and 9B each show a target F0 pattern obtained by using the present invention described as the second embodiment. Note that a synthesis text used in FIG. 9A is a sentence that is in the learning text, whereas a synthesis text used in FIG. 9B is a sentence that is not in the learning text. In any of FIGS. 9A and 9B, a solid-lined pattern denoted by symbol A represents an F0 pattern of a voice of a source speaker used as a reference, a dash-dot-lined pattern denoted by symbol B represents an F0 pattern obtained by actually analyzing a voice of a target speaker, and a dot-lined pattern denoted by symbol C represents an F0 pattern of the target speaker generated using the present invention.

First, a discussion is made as to the F0 patterns in FIG. 9A. Comparison of the F0 pattern denoted by symbol B with the F0 pattern denoted by symbol A allows to see that the target speaker has the following tendencies: a tendency to have a high frequency at the end of a phrase (see symbol P1) and a tendency in which a frequency-trough shifts forward (see symbol P2). As can be seen in the F0 pattern denoted by symbol C, such tendencies are certainly reproduced in the F0 pattern of the target speaker generated using the present invention (see symbols P1 and P2).

Next, a discussion is made as to the F0 patterns in FIG. 9B. Comparison of the F0 pattern denoted by symbol B with the F0 pattern denoted by symbol A allows to see that, again, the target speaker has a tendency to have a high frequency at the end of a phrase (see symbol P3). As can be seen in the F0 pattern denoted by symbol C, such tendency is properly reproduced in the F0 pattern of the target speaker generated using the present invention (see symbol P3). The F0 pattern denoted by B shown in FIG. 9B has a characteristic that, in the third intonation phrase, the second accent phrase (a second frequency peak) has a higher peak than the first accent phrase (a first frequency peak) (see symbols P4 and P4'). As can be seen in the F0 pattern denoted by C generated using the present invention, there is an attempt to reduce the first accent phrase and to increase the second accent phrase in the F0 pattern of the target speaker (see sings P4 and P4'). By including an emphasis position (the second accent phrase in this case) to the linguistic information, the characteristic in this part can possibly be reproduced more obviously.

Third Embodiment

Referring back to FIG. 1, a description is given of: the learning apparatus 50 that learns a combination of an F0 pattern of a target-speaker's voice and shift amounts thereof; and the fundamental-frequency-pattern generating apparatus 100 that uses a learning result of the learning apparatus 50. The constituents of the learning apparatus 50 according to the third embodiment are basically the same as those described in the first and second embodiments. Accordingly, descriptions will be given of only constituents having different functions, namely, the change-amount calculator 145, the shift-amount/change-amount learner 150, and the decision-tree information storage unit 155.

The change-amount calculator 145 of the third embodiment has the following function in addition to the functions of the change-amount calculator 145 according to the first embodiment. Specifically, the change-amount calculator 145 of the third embodiment further calculates, for each point on the target F0 pattern, a change amount in the time-axis direction and a change amount in the frequency-axis direction, between the point and an adjacent point. Note that the change amount here also includes primary and secondary dynamic feature vectors. The change amount in the frequency-axis direction may be a change amount of the logarithm of a frequency. The change-amount calculator 145 passes the calculated primary and secondary dynamic feature vectors to the shift-amount/change-amount learner 150 to be described next.

The shift-amount/change-amount learner 150 of the third embodiment learns a decision tree using the following information pieces as an input feature vector and an output feature vector. Specifically, the input feature vectors are the linguistic information obtained by parsing the learning text read from the linguistic information storage unit 110, and the output feature vectors include shift amounts and values of points on the target F0 pattern, which are static feature vectors, and change amounts of the shift amounts and the change amounts of the points on the target F0 pattern, which are dynamic feature vectors. Then, for each leaf node of the learned decision tree, the shift-amount/change-amount learner 150 obtains a distribution of each of the output feature vectors assigned to the leaf node and a distribution of a combination of the output feature vectors. Such distribution calculation will be helpful in a later step of generating a target F0 pattern using a learning result obtained here since a model of an absolute value can be created at a location where the absolute value is more characteristic than a shift amount. Note that the value of a point on the target F0 pattern in the frequency-axis direction may be the logarithm of a frequency.

Also in the third embodiment, the shift-amount/change-amount learner 150 creates, for each leaf node of the decision tree, models of the distributions for the output feature vectors assigned to the leaf node, by using a multidimensional, single or Gaussian Mixture Model (GMM). As a result of the modeling, mean, variance, and covariance can be obtained for each output feature vector and the combination of the output feature vectors. Since there is a known technique for learning a decision tree as described earlier, a detailed description therefor is omitted. For example, tools such as C4.5 and Weka can be used for the decision-tree learning.

The decision-tree information storage unit 155 of the third embodiment stores information on the decision tree learned by the shift-amount/change-amount learner 150, and for each leaf node of the decision tree, information on the distribution (mean, variance, and covariance) of each of the output feature vectors and on the distribution of the combination of the output feature vectors. Specifically, the distribution information thus stored includes the following distributions on: the shift amounts in the time-axis direction and in the frequency-axis direction; the value of each point on the target F0 pattern in the time-axis direction and in the frequency-axis direction; and a combination of these, namely, a combination of the shift amount in the time-axis direction and a value of a corresponding point on the target F0 pattern in the time-axis direction, and a combination of the shift amount in the frequency-axis direction and a value of the corresponding point on the frequency-axis direction in the target F0 pattern. Further, the decision-tree information storage unit 155 stores information on a distribution of the change amount of each shift amount and the change amount of each point on the target F0 pattern (primary and secondary dynamic feature vectors).

A flow of the processing for learning shift amounts by the learning apparatus 50 according to the third embodiment is basically the same as that by the learning apparatus 50 according to the first embodiment. However, the learning apparatus 50 according to the third embodiment further performs the following processing in Step 235 of the flowchart shown in FIG. 2. Specifically, the learning apparatus 50 calculates a primary dynamic feature vector and a secondary dynamic feature vector for each value on the target F0 pattern in the time-axis direction and in the frequency-axis direction, and stores the calculated amounts in the storage area.

In Step 240 thereafter, the learning apparatus 50 according to the third embodiment learns a decision tree using the following information pieces as an input feature vector and an output feature vector. Specifically, the input feature vectors are the linguistic information obtained by parsing the learning text, and the output feature vectors are: static feature vectors including a shift amount in the time-axis direction, a shift amount in the frequency-axis direction, and a value of a point on the target F0 pattern in the time-axis direction and that in the frequency-axis direction; and primary and secondary dynamic feature vectors corresponding to each static feature vector. In the last Step 245, the learning apparatus 50 according to the third embodiment obtains, for each leaf node of the learned decision tree, a distribution of each of the output feature vectors assigned to the leaf node, and a distribution of a combination of the output feature vectors. Then, the learning apparatus 50 stores information on the learned decision tree and information on the distributions for each leaf node in the decision-tree information storage unit 155, and the processing ends.

Next, a description is given of the fundamental-frequency-pattern generating apparatus 100 using a learning result from the learning apparatus 50 according to the third embodiment. Here, among the constituents of the fundamental-frequency-pattern generating apparatus 100, ones other than the learning apparatus 50 are described. The distribution-sequence predictor 160 of the third embodiment inputs linguistic information on a synthesis text into the learned decision tree, and predicts, for each time-series point, output feature vectors and a combination of the output feature vectors.

Specifically, from the decision-tree information storage unit 155, the distribution-sequence predictor 160 reads the information on the decision tree and the information, for each leaf node of the decision tree, on the distribution (mean, variance, and covariance) of each of the output feature vectors and of the combination of the output feature vectors. In addition, from the linguistic information storage unit 110, the distribution-sequence predictor 160 reads the linguistic information on the synthesis text. Then, the distribution-sequence predictor 160 inputs the linguistic information on the synthesis text into the decision tree thus read, and acquires, as an output therefrom, distributions (mean, variance, and covariance) of output feature vectors and of a combination of the output feature vectors, for each time-series point.

As described above, in the embodiment's, the output feature vectors include a static feature vector and a dynamic feature vector corresponding thereto. The static feature vector includes shift amounts in the time-axis direction and in the frequency-axis direction and values of a point on the target F0 pattern in the time-axis direction and in the frequency-axis direction. Further, the dynamic feature vector corresponding to the static feature vector further includes a primary dynamic feature vector and a secondary dynamic feature vector. To the optimizer 165 to be described next, the distribution-sequence predictor 160 passes a sequence of the predicted distributions (mean, variance, and covariance) of the output feature vectors and of the combination of the output feature vectors, that is, a mean vector and a variance-covariance matrix of each of the output feature vectors and of a combination of the output feature vectors.

The optimizer 165 optimizes the shift amounts by obtaining a shift-amount sequence that maximizes the likelihood calculated from the distribution sequence of the combination of the output feature vectors. A procedure of the optimization processing is described below. Note that the procedure for the optimization processing described below is performed separately for the combination of a shift amount in the time-axis direction and a value of a point on the target F0 pattern in the time-axis direction, and the combination of a shift amount in the frequency-axis direction and a value of a point on the target F0 pattern in the frequency-axis direction.

First, assume that a value of a point on the target F0 pattern is $y_t[j]$, and a value of a shift amount thereof is $\delta_y[i]$. Note that $y_t[j]$ and $\delta_y[i]$ have a relationship of $\delta_y[i]=y_t[j]-y_s[i]$, where $y_s[i]$ is a value of a point being on the source F0 pattern and corresponding to $y_t[j]$. Here, j represents a time index.

Namely, when the optimization processing is performed for the time-axis direction, $y_t[j]$ is a value of (position at) the j-th frame or the j-th phoneme in the time-axis direction. Similarly, when the optimization processing is performed for the frequency-axis direction, $y_t[j]$ is the logarithm of a frequency at the j-th frame or the j-th phoneme. Further, $\Delta y_t[j]$ and $\Delta^2 y_t[j]$ represent the primary dynamic feature value and the secondary dynamic feature value that correspond to $y_t[j]$, respectively. Similarly, $\delta_y[i]$ and $\Delta^2\delta_y[i]$ represent the primary dynamic feature value and the secondary dynamic feature value that correspond to $\delta_y[i]$, respectively. An observation vector o having these amounts is defined as follows.

$$(z_{yt}[j]^T, d_y[i]^T)^T = \begin{pmatrix} (y_t[j], \Delta y_t[j], \Delta^2 y_t[j])^T \\ (\delta_y[i], \Delta\delta_y[i], \Delta^2\delta_y[i])^T \end{pmatrix} \quad \text{[Expression 10]}$$

The observation vector o defined as above can be expressed as follows.

$$\begin{aligned} o &= \begin{pmatrix} z_{yt} \\ d_y \end{pmatrix} = \begin{pmatrix} Wy_t \\ W\delta_y \end{pmatrix} \\ &= \begin{pmatrix} Wy_t \\ W(y_t - y_s) \end{pmatrix} \\ &= Uy_t - Vy_s \end{aligned} \quad \text{[Expression 11]}$$

Note here that $U=(W^T W^T)^T$ and $V=(0^2 W^2)^T$, where 0 denotes a zero matrix and a matrix W satisfies Expression 7.

Assume that a distribution sequence $\lambda_o$ of the observation vector o has been predicted by the distribution-sequence predictor 160. Then, the likelihood of the observation vector with respect to the predicted distribution sequence $\lambda_o$ of the observation vector o can be expressed as the following expression.

$$\begin{aligned} L &= -\frac{1}{2}(o-\mu_o)^T \Sigma_o^{-1}(o-\mu_o) \\ &= -\frac{1}{2}\{Uy_t - Vy_s - \mu_o\}^T \Sigma_o^{-1}\{Uy_t - Vy_s - \mu_o\} \\ &= -\frac{1}{2}(Uy_t - u_o')^T \Sigma_o^{-1}(Uy_i - \mu_o') \end{aligned} \quad \text{[Expression 12]}$$

Note here that $\mu_o'=Vy_s+\mu_o$. Further, $y_s$ is, as described earlier, a value of a point on the source F0 pattern in the time-axis direction or the frequency-axis direction.

In the above expression, $\mu_o$ and $\Sigma_o$ are a mean vector and a variance-covariance matrix, respectively, and are the contents of the distribution sequence $\lambda_o$ calculated by the distribution-sequence predictor 160. Specifically, $\mu_o$ and $\Sigma_o$ are expressed as follows.

$$\mu_o = \begin{pmatrix} \mu_{zy} \\ \mu_{dy} \end{pmatrix} \quad \text{[Expression 13]}$$

Note here that $\mu_{zy}$, is a mean vector of zy and $\mu_{dy}$ is a mean vector of dy, where $zy=Wy_s$ and $dy=W\delta_y$. The matrix W satisfies Expression 7 here, too.

$$\Sigma_o = \begin{pmatrix} \Sigma_{zyt} & \Sigma_{zytdy} \\ \Sigma_{zytdy} & \Sigma_{dy} \end{pmatrix} \quad \text{[Expression 14]}$$

Note here that $\Sigma_{zyt}$ is a covariance matrix for the target F0 pattern (in either the time-axis direction or the frequency-axis direction), and $\Sigma_{dy}$ is a covariance matrix for a shift amount (in either the time-axis direction or the frequency-axis direction), $\Sigma_{zytdy}$ is a covariance matrix for the target F0 pattern and the shift amount (a combination of them in the time-axis direction or in the frequency-axis direction).

Further, an optimal solution for $y_t$ for maximizing L can be obtained by the following expression.

$$\begin{aligned} \tilde{y}_t &= (U^T \Sigma_o^{-1} U)^{-1} U^T \Sigma_o^{-1} \mu_o' \\ &= R^{-1} r \end{aligned} \quad \text{[Expression 15]}$$

Note here that $R=U^T\Sigma_o^{-1}U$, and $r=U^T\Sigma_o^{-1}\mu_o'$. An inverse matrix of $\Sigma_o$ needs to be obtained to find R. The inverse matrix of $\Sigma_o$ can easily be obtained if the covariance matrices $\Sigma_{zyt}$, $\Sigma_{zytdy}$, and $\Sigma_{dy}$ are diagonal matrices. For example, with the diagonal components being a[i], b[i], and c[i] in this order, the diagonal components of the inverse matrix of $\Sigma_o$ can be obtained by $c[i]/(a[i]\,c[i]-b[i]^2)$.

As described above, in the third embodiment, a target F0 pattern can be directly obtained not by using shift amounts but through optimization. It should be noted that $y_s$, namely, a value of a point on the source F0 pattern needs to be referred to in order to obtain the optimal solution for $y_t$. The optimizer 165 passes the sequence of values of points in the time-axis direction and the sequence of values of points in the frequency-axis direction, to the target F0 pattern generator 170 to be described next.

The target F0 pattern generator 170 generates a target F0 pattern corresponding to the synthesis text by ordering, in time, combinations of a value of a point in the time-axis direction and a value of a corresponding point in the frequency-axis direction, which are obtained by the optimizer 165.

A flow of the processing for generating the target F0 pattern by the fundamental-frequency-pattern generating apparatus 100 according to the third embodiment is also basically the same as that by the fundamental-frequency-pattern generating apparatus 100 according to the second embodiment. However, in Step 815 of the flowchart shown in FIG. 8, the fundamental-frequency-pattern generating apparatus 100 according to the third embodiment reads information on a decision tree from the decision-tree information storage unit 155, inputs linguistic information on a synthesis text into this decision tree, and acquires, as an output therefrom, a sequence of distributions (mean, variance, and covariance) of output feature vectors and of a combination of the output feature vectors.

In the following Step 820, the fundamental-frequency-pattern generating apparatus 100 performs the optimization processing by obtaining a sequence of values of points on the target F0 pattern in the time-axis direction and a sequence of values of points on the target F0 pattern in the frequency-axis direction which have the highest likelihood, from among a distribution sequence of combinations of output feature vectors.

Finally, in Step 825, the fundamental-frequency-pattern generating apparatus 100 generates a target F0 pattern corresponding to the synthesis text by ordering, in time, combinations of a value of a point in the time-axis direction and a value of the corresponding point in the frequency-axis direction, which are obtained by the optimizer 165.

Figure 10:
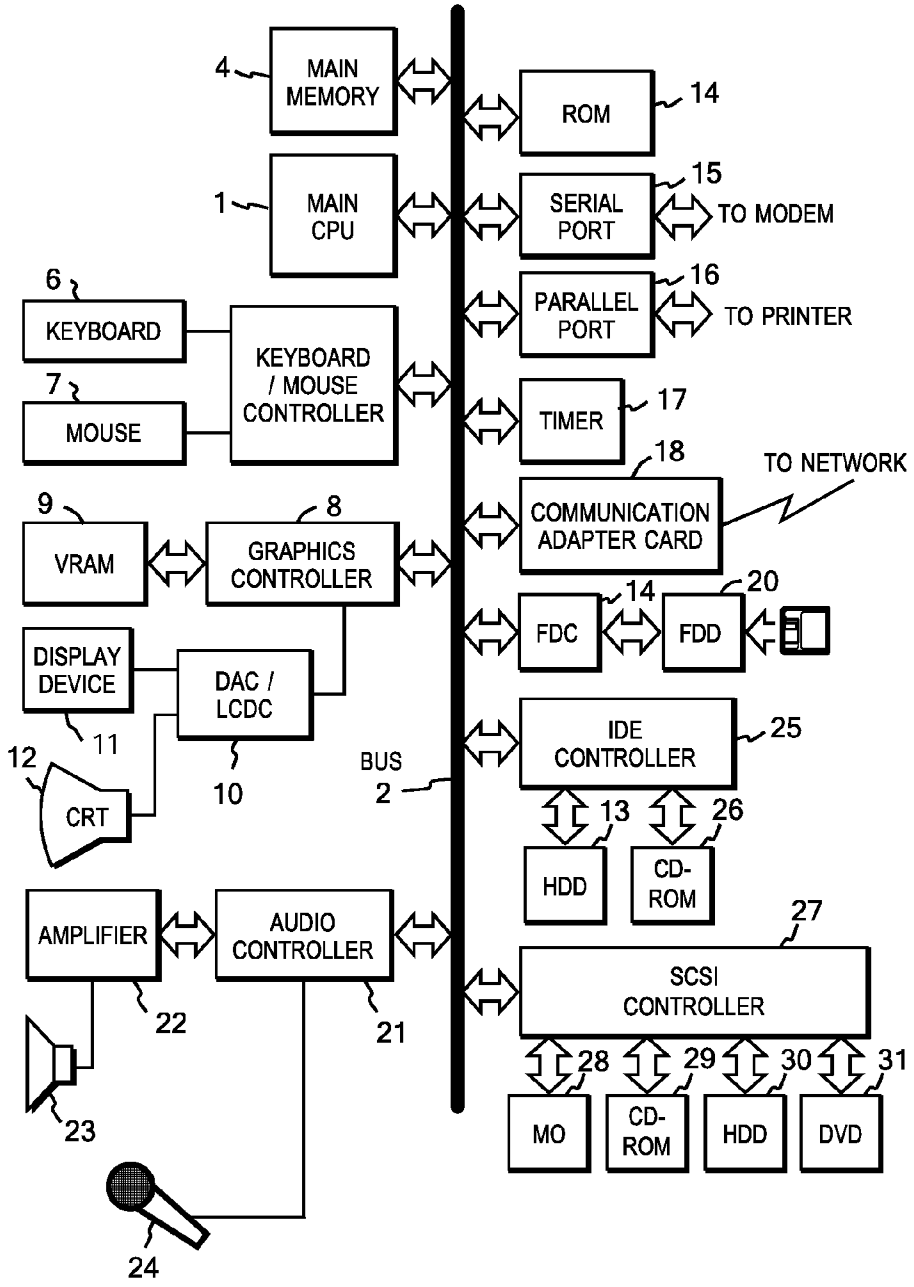
FIG. 10 is a diagram showing an example of a preferred hardware configuration of an information processing device for implementing the learning apparatus 50 and the fundamental-frequency-pattern generating apparatus 100 according to the embodiments of the present invention.

FIG. 10 is a diagram showing an example of a preferred hardware configuration of a computer implementing the learning apparatus 50 and the fundamental-frequency-pattern generating apparatus 100 of the embodiments of the present invention. The computer includes a central processing unit (CPU) 1 and a main memory 4 which are connected to a bus 2. Moreover, hard-disk devices 13 and 30 and removable storages (external storage systems that allow changing of a recording medium) such as, CD-ROM devices 26 and 29, a flexible-disk device 20, an MO device 28, and a DVD device 31 are connected to the bus 2 via a flexible-disk controller 19, an IDE controller 25, an SCSI controller 27 and the like.

A storage medium such as a flexible disk, an MO, a CD-ROM, and a DVD-ROM is inserted into the corresponding removable storage. Codes of a computer program for carrying out the present invention can be recorded on these storage media, the hard-disk device 13 and 30, or a ROM 14. The codes of the computer program give instructions to the CPU and the like in cooperation with an operating system. To be more specific, a program according to the present invention for learning shift amounts and a combination of the shift amounts and a target F0 pattern, a program for generating a fundamental-frequency pattern, and data on the above-described information on a source-speaker model and the like can be stored in the various storage devices described above of the computer functioning as the learning apparatus 50 or the fundamental-frequency-pattern generating apparatus 100. Then, these multiple computer programs are executed by being loaded on the main memory 4. The computer programs can be stored in a compressed form or can be divided into two or more portions to be stored in respective multiple media.

The computer receives input from input devices such as a keyboard 6 and a mouse 7 through a keyboard/mouse controller 5. The computer receives input from a microphone 24 through an audio controller 21, and outputs a voice from a loudspeaker 23. Through a graphics controller 10, the computer is connected to a display device 11 for presenting visual data to a user. The computer can communicate with another computer or the like by being connected to a network through a network adapter 18 (an Ethernet (R) card or a token-ring card) or the like.

It should be easily understood from the above descriptions that the computer preferred for implementing the learning apparatus 50 and the fundamental-frequency-pattern generating apparatus 100 of the embodiments of the present invention can be implemented with a regular information processing device such as a personal computer, a work station, or a main frame, or with a combination of these. Note that the constituents described above are mere examples, and not all the constituents are essential to the present invention.

The present invention has been described above using the embodiments. The technical scope of the present invention, however, is not limited to the embodiments given above. It is apparent to those skilled in the art that various modifications and improvements can be made to the embodiments. For example, in the embodiments, the fundamental-frequency-pattern generating apparatus 100 includes the learning apparatus 50. However, the fundamental-frequency-pattern generating apparatus 100 may include only part of the learning apparatus 50 (namely, the text parser 105, the linguistic information storage unit 110, the source-speaker-model information storage unit 120, the F0 pattern predictor 122, and the decision-tree information storage unit 155). Such forms obtained by making modifications and improvements are naturally included in the technical scope of the present invention.

The invention claimed is:

1. A learning apparatus for learning shift amounts between a fundamental-frequency pattern of a reference voice and a fundamental-frequency pattern of a target speaker's voice, the fundamental-frequency pattern representing a temporal change in a fundamental frequency, the learning apparatus comprising:

- a computer memory capable of storing machine instructions; and
- a processor in communication with said computer memory, said processor configured to access the memory, the processor performing
  - associating a fundamental-frequency pattern of a reference voice of a learning text with a fundamental-frequency pattern of a target speaker's voice of the learning text by associating peaks and troughs of the fundamental-frequency pattern of the reference voice with corresponding peaks and troughs of the fundamental-frequency pattern of the target speaker's voice;
  - calculating shift amounts of each of points on the fundamental-frequency pattern of the target speaker's voice from a corresponding point on the fundamental-frequency pattern of the reference voice in reference to a result of the association, the shift amounts including an amount of shift in a time axis direction and an amount of shift in a frequency axis direction; and
  - learning a decision tree by using, as an input feature vector, linguistic information obtained by parsing the learning text, and by using, as an output feature vector, the shift amounts thus calculated.

2. The learning apparatus according to claim 1, wherein the associating the fundamental-frequency pattern includes:

- calculating a set of affine transformations for transforming the fundamental-frequency pattern of the reference voice into a pattern having a minimum difference from the fundamental-frequency pattern of the target speaker's voice; and
- associating each of the points on the fundamental-frequency pattern of the reference voice with one of the points on the fundamental-frequency pattern of the target speaker's voice, along a time axis direction as an X-axis and a frequency axis direction as a Y-axis, and the one of the points having a same X-coordinate value as a point obtained by transforming the point on the fundamental-frequency pattern of the reference voice by using a corresponding one of the affine transformations.

3. The learning apparatus according to claim 2, wherein the calculating shift amounts of each of points sets includes an intonation phrase as an initial value for a processing unit used for obtaining the affine transformations, and recursively bisects the processing unit until the calculating shift amounts obtains the affine transformations that transform the fundamental-frequency pattern of the reference voice into a pattern having a minimum difference from the fundamental-frequency pattern of the target speaker's voice.

4. The learning apparatus according to claim 1, wherein the associating and a shift-amount are performed on at least one of a frame and a phoneme basis.

5. The learning apparatus according to claim 1, further comprising:

- calculating a change amount between each two adjacent points of each of the calculated shift amounts, wherein the learning the decision tree by using, as the output feature vectors, the shift amounts and the change amounts of the respective shift amounts, the shift amounts being static feature vectors, and the change amounts being dynamic feature vectors.

6. The learning apparatus according to claim 5, wherein each of the change amounts of the shift amounts includes a primary dynamic feature vector representing an inclination of the shift amount and a secondary dynamic feature vector representing a curvature of the shift amount.

7. The learning apparatus according to claim 5, wherein the calculating the change amount further calculates change amounts between each two adjacent points on the fundamental-frequency pattern of the target speaker's voice in the time axis direction and in the frequency axis direction, wherein the learning the decision tree includes learning the decision tree by additionally using, as the static feature vectors, a value in the time axis direction and a value in the frequency axis direction of each point on the fundamental-frequency pattern of the target speaker's voice, and by additionally using, as the dynamic feature vectors, the change amount in the time axis direction and the change amount in the frequency axis direction, and for each of leaf nodes of the learned decision tree, the learning the decision tree obtains a distribution of each of the output feature vectors assigned to the leaf node and a distribution of each of combinations of the output feature vectors.

8. The learning apparatus according to claim 5, wherein for each of leaf nodes of the decision tree, the learning the decision tree creates a model of a distribution of each of the output feature vectors assigned to the leaf node by using at least one of a multidimensional single and a Gaussian Mixture Model (GMM).

9. The learning apparatus according to claim 5, wherein the shift amounts for each of the points on the fundamental-frequency pattern of the target speaker's voice are calculated on at least one of a frame and a phoneme basis.

10. The learning apparatus according to claim 1, wherein the linguistic information includes information on at least one of an accent type, a part of speech, a phoneme, and a mora position.

11. A fundamental-frequency-pattern generating apparatus that generates a fundamental-frequency pattern of a target speaker's voice on the basis of a fundamental-frequency pattern of a reference voice, the fundamental-frequency pattern representing a temporal change in a fundamental frequency, the fundamental-frequency-pattern generating apparatus comprising:

a computer memory capable of storing machine instructions; and a processor in communication with said computer memory, said processor configured to access the memory, the processor performing associating a fundamental-frequency pattern of the reference voice of a learning text with a fundamental-frequency pattern of the target speaker's voice of the learning text by associating peaks and troughs of the fundamental-frequency pattern of the reference voice with corresponding peaks and troughs of the fundamental-frequency pattern of the target speaker's voice;

calculating shift amounts of each of time-series points constituting the fundamental-frequency pattern of the target speaker's voice from a corresponding one of time series points constituting the fundamental-frequency pattern of the reference voice in reference to a result of the association, the shift amounts including an amount of shift in a time axis direction and an amount of shift in a frequency axis direction;

calculating a change amount between each two adjacent time-series points of each of the calculated shift amounts;

learning a decision tree by using input feature vectors which are linguistic information obtained by parsing the learning text, and by using output feature vectors including, as a static feature vector, the shift amounts and, as a dynamic feature vector, the change amounts of the respective shift amounts, and for obtaining a distribution of each of the output feature vectors assigned to each of leaf nodes of the learned decision tree;

inputting linguistic information obtained by parsing a synthesis text into the decision tree, and for predicting distributions of the output feature vectors at the respective time-series points;

optimizing the shift amounts by obtaining a sequence of the shift amounts that maximizes a likelihood calculated from a sequence of the predicted distributions of the output feature vectors; and generating a fundamental-frequency pattern of the target speaker's voice of the synthesis text by adding the sequence of the shift amounts to the fundamental-frequency pattern of the reference voice of the synthesis text.

12. The fundamental-frequency-pattern generating apparatus according to claim 11, wherein the associating the fundamental-frequency pattern includes:

a calculating a set of affine transformations for transforming the fundamental-frequency pattern of the reference voice into a pattern having a minimum difference from the fundamental-frequency pattern of the target speaker's voice; and associating each of the time-series points constituting the fundamental-frequency pattern of the reference voice with one of the time-series points constituting the fundamental-frequency pattern of the target speaker's voice, along a time axis direction as an X-axis and a frequency axis direction as a Y-axis, the one of the points having a same X-coordinate value as a point obtained by transforming the time-series points constituting the fundamental-frequency pattern of the reference voice by using a corresponding one of the affine transformations.

13. The fundamental-frequency-pattern generating apparatus according to claim 11, wherein the learning the decision tree by obtaining a mean, a variance, and a covariance of an output feature vector assigned to the leaf node.

14. A fundamental-frequency-pattern generating apparatus that generates a fundamental-frequency pattern of a target speaker's voice on the basis of a fundamental-frequency pattern of a reference voice, the fundamental-frequency pattern representing a temporal change in a fundamental frequency, the fundamental-frequency-pattern generating apparatus comprising:

associating a fundamental-frequency pattern of the reference voice of a learning text with a fundamental-frequency pattern of the target speaker's voice of the learning text by associating peaks and troughs of the fundamental-frequency pattern of the reference voice with corresponding peaks and troughs of the fundamental-frequency pattern of the target speaker's voice;

calculating shift amounts of each of time-series points constituting the fundamental-frequency pattern of the target speaker's voice from a corresponding one of time-series points constituting the fundamental-frequency pattern of the reference voice in reference to a result of the association, the shift amounts including an amount of shift in a time axis direction and an amount of shift in a frequency axis direction;

calculating a change amount between each two adjacent time-series points of each of the shift amounts, and calculates a change amount between each two adjacent time-series points on the fundamental-frequency pattern of the target speaker's voice;

learning a decision tree by using input feature vectors which are linguistic information obtained by parsing the learning text, and by using output feature vectors including, as static feature vector, the shift amounts and values of the respective time-series points on the fundamental-frequency pattern of the target speaker's voice, as well as including, as a dynamic feature vector, the change amounts of the respective shift amounts and the change amounts of the respective time-series points on the fundamental-frequency pattern of the target speaker's voice and for obtaining, for each of leaf nodes of the learned decision tree, a distribution of each of the output feature vectors assigned to the leaf node and a distribution of each of combinations of the output feature vectors;

inputting linguistic information obtained by parsing a synthesis text into the decision tree, and predicting a distribution of each of the output feature vectors and a distribution of each of the combinations of the output feature vectors, for each of the time-series points;

performing optimization processing by calculation in which values of each of the time-series points on the fundamental-frequency pattern of the target speaker's voice in the time axis direction and in the frequency axis direction are obtained so as to maximize a likelihood calculated from a sequence of the predicted distributions of the respective output feature vectors and the predicted distribution of each of the combinations of the output feature vectors; and generating a fundamental-frequency pattern of the target speaker's voice by ordering, in time, combinations of the value in the time axis direction and the corresponding value in the frequency axis direction which are obtained by the optimization processor.

15. The fundamental-frequency-pattern generating apparatus according to claim 14, wherein the associating a fundamental-frequency pattern includes:

calculating a set of affine transformations for transforming the fundamental-frequency pattern of the reference voice into a pattern having a minimum difference from the fundamental-frequency pattern of the target speaker's voice; and associating each of the time-series points on the fundamental-frequency pattern of the reference voice with one of the time-series points on the fundamental-frequency pattern of the target speaker's voice, along a time axis direction as an X-axis and a frequency axis direction as a Y-axis, the one of the points having a same X-coordinate value as a point obtained by transforming the time-series points on the fundamental-frequency pattern of the reference voice by using a corresponding one of the affine transformations.

16. A learning method for learning shift amounts between a fundamental-frequency pattern of a reference voice and a fundamental-frequency pattern of a target speaker's voice by using calculation processing by a computer, the fundamental-frequency pattern representing a temporal change in a fundamental frequency, the learning method comprising:

associating a fundamental-frequency pattern of the reference voice of a learning text with a fundamental-frequency pattern of the target speaker's voice of the learning text by associating peaks and troughs of the fundamental-frequency pattern of the reference voice with corresponding peaks and troughs of the fundamental-frequency pattern of the target speaker's voice, and then storing correspondence relationships thus obtained in a storage area of the computer;

reading the correspondence relationships from the storage area, and obtaining shift amounts of each point on the fundamental-frequency pattern of the target speaker's voice from a corresponding one of points on the fundamental-frequency pattern of the reference voice, the shift amounts including an amount of shift in a time axis direction and an amount of shift in a frequency axis direction, and storing the shift amounts in the storage area; and reading the shift amounts from the storage area, and learning a decision tree by using, as an input feature vector, linguistic information obtained by parsing the learning text, and by using, as an output feature vector, the shift amounts.

17. The learning method according to claim 16, wherein the association includes:

calculating a set of affine transformations for transforming the fundamental-frequency pattern of the reference voice into a pattern having a minimum difference from the fundamental-frequency pattern of the target speaker's voice; and associating each of the points on the fundamental-frequency pattern of the reference voice with one of the points on the fundamental-frequency pattern of the target speaker's voice, along a time axis direction as an X-axis and a frequency axis direction as a Y-axis, the one of the points having a same X-coordinate value as a point obtained by transforming time-series points on the fundamental-frequency pattern of the reference voice by using a corresponding one of the affine transformations.

18. A computer program product embodied in a non-transitory computer readable medium, and including instructions which, when implemented, cause a computer to carry out the steps of a method for learning shift amounts between a fundamental-frequency pattern of a reference voice and a fundamental-frequency pattern of a target speaker's voice, the fundamental-frequency pattern representing a temporal change in a fundamental frequency, comprising:

associating a fundamental-frequency pattern of the reference voice of a learning text with a fundamental-frequency pattern of the target speaker's voice of the learning text by associating peaks and troughs of the fundamental-frequency pattern of the reference voice with corresponding peaks and troughs of the fundamental-frequency pattern of the target speaker's voice, and then storing correspondence relationships thus obtained in a storage area of the computer;

reading the correspondence relationships from the storage area, and obtaining shift amounts of each of points on the fundamental-frequency pattern of the target speaker's voice from a corresponding one of points on the fundamental-frequency pattern of the reference voice, the shift amounts including an amount of shift in a time axis direction and an amount of shift in a frequency axis direction, and storing the shift amounts in the storage area; and reading the shift amounts from the storage area, and learning a decision tree by using, as an input feature vector, linguistic information obtained by parsing the learning text, and by using, as an output feature vector, the shift amounts.

19. The computer program product according to claim 18, causing the computer to execute sub-steps through which the computer associates the points on the fundamental-frequency pattern of the reference voice with the points on the fundamental-frequency pattern of the target speaker's voice, the sub-steps including:

a first sub-step of calculating a set of affine transformations for transforming the fundamental-frequency pattern of the reference voice into a pattern having a minimum difference from the fundamental-frequency pattern of the target speaker's voice; and a second sub-step of, while regarding a time axis direction and a frequency axis direction of the fundamental-frequency pattern as an X-axis and a Y-axis, respectively, associating each of the points on the fundamental-frequency pattern of the reference voice with one of the points on the fundamental-frequency pattern of the target speaker's voice, the one of the points having the same X-coordinate value as a point obtained by transforming time-series points constituting the fundamental-frequency pattern of the reference voice by using a corresponding one of the affine transformations.

* * * * *